(12) United States Patent
Kompella et al.

(10) Patent No.: US 8,693,471 B2
(45) Date of Patent: *Apr. 8, 2014

(54) GRACEFUL RESTART FOR USE IN NODES EMPLOYING LABEL SWITCHED PATH SIGNALING PROTOCOLS

(75) Inventors: Kireeti Kompella, Los Altos, CA (US); Manoj Leelanivas, Los Gatos, CA (US); Ping Pan, Emerson, NJ (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 511 days.

This patent is subject to a terminal disclaimer.

(21) Appl. No.: 13/021,017

(22) Filed: Feb. 4, 2011

(65) Prior Publication Data

US 2011/0128968 A1 Jun. 2, 2011

Related U.S. Application Data

(63) Continuation of application No. 12/101,245, filed on Apr. 11, 2008, now Pat. No. 7,903,651, which is a continuation of application No. 10/095,000, filed on Mar. 11, 2002, now Pat. No. 7,359,377.

(60) Provisional application No. 60/299,813, filed on Jun. 19, 2001, provisional application No. 60/325,099, filed on Sep. 25, 2001, provisional application No. 60/327,402, filed on Oct. 4, 2001.

(51) Int. Cl.
*H04L 12/56* (2011.01)
*G06F 15/173* (2006.01)

(52) U.S. Cl.
USPC ........... 370/389; 370/224; 370/254; 370/352; 370/392; 370/401; 370/410; 709/224; 709/238; 714/1; 714/2; 714/6

(58) Field of Classification Search
USPC ........ 370/328–463; 709/224, 238; 714/1, 2, 6
See application file for complete search history.

(56) References Cited

U.S. PATENT DOCUMENTS

| | | | | |
|---|---|---|---|---|
| 3,835,260 A | * | 9/1974 | Prescher et al. | 379/237 |
| 5,701,301 A | * | 12/1997 | Weisser, Jr. | 370/428 |
| 5,920,705 A | * | 7/1999 | Lyon et al. | 709/240 |
| 6,374,102 B1 | * | 4/2002 | Brachman et al. | 455/422.1 |
| 6,374,303 B1 | * | 4/2002 | Armitage et al. | 709/242 |
| 6,407,994 B1 | * | 6/2002 | Archer | 370/351 |
| 6,535,730 B1 | * | 3/2003 | Chow et al. | 455/416 |
| 6,574,470 B1 | * | 6/2003 | Chow et al. | 455/417 |
| 6,587,683 B1 | * | 7/2003 | Chow et al. | 455/417 |
| 6,591,115 B1 | * | 7/2003 | Chow et al. | 455/555 |

(Continued)

*Primary Examiner* — Ayaz Sheikh
*Assistant Examiner* — Venkatesh Haliyur
(74) *Attorney, Agent, or Firm* — John C. Pokotylo; Straub & Pokotylo

(57) ABSTRACT

When a node has to restart its control component, or a (e.g., label-switched path signaling) part of its control component, if that node can preserve its forwarding information across the restart, the effects of such restarts on label switched path(s) include the restarting node are minimized. A node's ability to preserve forwarding information across a control component (part) restart is advertised. In the event of a restart, stale forwarding information can be used for a limited time before. The restarting node can use its forwarding information, as well as received label-path advertisements, to determine which of its labels should be associated with the path, for advertisement to its peers.

12 Claims, 9 Drawing Sheets

(56) References Cited

U.S. PATENT DOCUMENTS

| | | | |
|---|---|---|---|
| 6,606,493 B1 * | 8/2003 | Chow et al. | 455/414.1 |
| 6,606,505 B1 * | 8/2003 | Chow et al. | 455/555 |
| 6,618,600 B1 * | 9/2003 | Chow et al. | 455/567 |
| 6,631,258 B1 * | 10/2003 | Chow et al. | 455/417 |
| 6,643,507 B1 * | 11/2003 | Chow et al. | 455/422.1 |
| 6,654,603 B1 * | 11/2003 | Chow et al. | 455/414.1 |
| 6,654,615 B1 * | 11/2003 | Chow et al. | 455/555 |
| 6,680,943 B1 * | 1/2004 | Gibson et al. | 370/392 |
| 6,711,401 B1 * | 3/2004 | Chow et al. | 455/414.1 |
| 6,738,615 B1 * | 5/2004 | Chow et al. | 455/415 |
| 6,745,025 B1 * | 6/2004 | Chow et al. | 455/417 |
| 6,771,953 B1 * | 8/2004 | Chow et al. | 455/417 |
| 6,785,560 B1 * | 8/2004 | Chow et al. | 455/564 |
| 6,819,945 B1 * | 11/2004 | Chow et al. | 455/567 |
| 6,961,559 B1 * | 11/2005 | Chow et al. | 455/414.1 |
| 6,973,229 B1 * | 12/2005 | Tzathas et al. | 385/16 |
| 7,013,084 B2 * | 3/2006 | Battou et al. | 398/45 |
| 7,359,377 B1 * | 4/2008 | Kompella et al. | 370/389 |
| 7,394,811 B2 * | 7/2008 | Gibson et al. | 370/392 |
| 7,688,725 B2 * | 3/2010 | Sami et al. | 370/230 |
| 7,903,651 B2 * | 3/2011 | Kompella et al. | 370/389 |
| 8,363,667 B2 * | 1/2013 | Kompella | 370/401 |
| 2002/0003797 A1 * | 1/2002 | Rautenberg | 370/389 |
| 2002/0032853 A1 * | 3/2002 | Preston et al. | 713/151 |
| 2002/0165962 A1 * | 11/2002 | Alvarez et al. | 709/226 |
| 2002/0174207 A1 * | 11/2002 | Battou | 709/223 |
| 2002/0176131 A1 * | 11/2002 | Walters et al. | 359/118 |
| 2003/0023709 A1 * | 1/2003 | Alvarez et al. | 709/223 |
| 2003/0163555 A1 * | 8/2003 | Battou et al. | 709/223 |
| 2007/0053359 A1 * | 3/2007 | Wu et al. | 370/392 |
| 2008/0186852 A1 * | 8/2008 | Sami et al. | 370/235 |
| 2008/0192762 A1 * | 8/2008 | Kompella et al. | 370/410 |
| 2011/0128968 A1 * | 6/2011 | Kompella et al. | 370/410 |

* cited by examiner

| IN PORT (INTERFACE) | IN LABEL | OUT PORT (NEXT HOP) | OUT LABEL | STALE? (YES/NO) |
|---|---|---|---|---|
| | | | | |

GRACEFUL RESTART FOR USE IN NODES EMPLOYING LABEL SWITCHED PATH SIGNALING PROTOCOLS

§0. RELATED APPLICATIONS

This application is a continuation of U.S. patent application Ser. No. 12/101,245 (referred to as "the '245 application" and incorporated herein by reference), titled "GRACEFUL RESTART FOR USE IN NODES EMPLOYING LABEL SWITCHED PATH SIGNALING PROTOCOLS," filed on Apr. 11, 2008, now U.S. Pat. No. 7,903,651 and listing Kireeti KOMPELLA, Manoj LEELANIVAS, Ping PAN, and Yakov REKHTER as the inventors, the '245 application being a continuation of U.S. patent application Ser. No. 10/095,000 (referred to as "the '000 application" and incorporated herein by reference), titled "GRACEFUL RESTART FOR USE IN NODES EMPLOYING LABEL SWITCHED PATH SIGNALING PROTOCOLS," filed on Mar. 11, 2002, and listing Kireeti KOMPELLA, Manoj LEELANIVAS, Ping PAN, and Yakov REKHTER as the inventors (which issued as U.S. Pat. No. 7,359,377 on Apr. 15, 2008), the '000 application claiming benefit under 35 U.S.C. §119(e)(1), to the filing dates of: (i) provisional patent application Ser. No. 60/299,813, entitled "GRACEFUL RESTART MECHANISM FOR RSVP-TE", filed on Jun. 19, 2001 and listing Ping Pan, Yakov Rekhter, and Kireeti Kompella as the inventors; (ii) provisional patent application Ser. No. 60/325,099, entitled "GRACEFUL RESTART MECHANISM FOR LDP", filed on Sep. 25, 2001, and listing Manoj Leelanivas and Yakov Rekhter as the inventors; and (iii) provisional patent application Ser. No. 60/327,402, entitled "GRACEFUL RESTART MECHANISM FOR BGP WITH MPLS", filed on Oct. 4, 2001, and listing Yakov Rekhter and Manoj Leelanivas as inventors, for any inventions disclosed in the manner provided by 35 U.S.C. §112, ¶111. The three provisional applications are also expressly incorporated herein by reference. However, any limiting statements made in the provisional applications are directed to the specific embodiments described in those provisional applications, and not necessarily to the present invention. Rather, these provisional applications should be considered to describe exemplary embodiments of the invention.

§1. BACKGROUND OF THE INVENTION

§1.1 Field of the Invention

The present invention concerns the establishment, use, and/or maintenance of label switched paths, particularly when a protocol used to establish, maintain, and/or tear down such paths, or when a node through which the path passes, is restarting. More specifically, the present invention minimizes the effects of protocol or node control component restart(s) on the flow of data (such as a flow of packets) over the label switched path.

§1.2 Description of Related Art

The description of art in this section is not, and should not be interpreted to be, an admission that such art is prior art to the present invention. Although one skilled in the art will be familiar with networking, circuit switching, packet switching, label switched paths, and protocols such as BGP, RSVP, MPLS, and LDP, each is briefly introduced below for the convenience of the less experienced reader. More specifically, circuit switched and packet switched networks are introduced in §1.2.1. The need for label switched paths, as well as their operation and establishment, are introduced in §§1.2.2-1.2.4 below. Finally, "failures" in a label switched path, as well as typical failure responses, are introduced in §1.2.5 below.

§1.2.1 Circuit Switched Networks and Packet Switched Networks

Circuit switched networks establish a connection between hosts (parties to a communication) for the duration of their communication ("call"). The public switched telephone network ("PSTN") is an example of a circuit switched network, where parties to a call are provided with a connection for the duration of the call. Unfortunately, many communications applications, circuit switched networks use network resources inefficiently. Consider for example, the communications of short, infrequent "bursts" of data between hosts. Providing a connection for the duration of a call between such hosts simply wastes communications resources when no data is being transferred. Such inefficiencies have lead to packet switched networks.

Packet switched networks, forward addressed data (referred to as "packets" in the specification below without loss of generality), typically on a best efforts basis, from a source to a destination. Many large packet switched networks are made up of interconnected nodes (referred to as "routers" in the specification below without loss of generality). The routers may be geographically distributed throughout a region and connected by links (e.g., optical fiber, copper cable, wireless transmission channels, etc.). In such a network, each router typically interfaces with (e.g., terminates) multiple links.

Packets traverse the network by being forwarded from router to router until they reach their destinations (as typically specified by so-called layer-3 addresses in the packet headers). Unlike switches, which establish a connection for the duration of a "call" or "session" to send data received on a given input port out on a given output port, routers determine the destination addresses of received packets and, based on these destination addresses, determine, in each case, the appropriate link on which to send them. Routers may use protocols to discover the topology of the network, and algorithms to determine the most efficient ways to forward packets towards a particular destination address(es). Since the network topology can change, packets destined for the same address may be routed differently. Such packets can even arrive out of sequence.

§1.2.2 The Need for Label Switched Paths

In some cases, it may be considered desirable to establish a fixed path through at least a part of a packet switched network for at least some packets. More specifically, merely using known routing protocols (e.g., shortest path algorithms) to determine paths is becoming unacceptable in light of the ever-increasing volume of Internet traffic and the mission-critical nature of some Internet applications. Such known routing protocols can actually contribute to network congestion if they do not account for bandwidth availability and traffic characteristics when constructing routing (and forwarding) tables.

Traffic engineering permits network administrators to map traffic flows onto an existing physical topology. In this way, network administrators can move traffic flows away from congested shortest paths to a less congested path, or paths. Alternatively, paths can be determined autonomously, even on demand. Label-switching can be used to establish a fixed path from a head-end node (e.g., an ingress router) to a tail-end node (e.g., an egress router). The fixed path may be determined using known protocols such as RSVP and LDP. Once a path is determined, each router in the path may be configured (manually, or via some signaling mechanism) to forward packets to a peer (e.g., a "downstream" or "upstream" neighbor) router in the path. Routers in the path determine that a given set of packets (e.g., a flow) are to be sent over the fixed path (as opposed to being routed individually) based on unique labels added to the packets. Analogs of label switched paths can also be used in circuit switched networks. For example, generalized MPLS (GMPLS) can be used in circuit switched networks having switches, optical cross-connects, SONET/SDH cross-connects, etc. In MPLS a label is provided, explicitly, in the data. However, in GMPLS, a label to be associated with data can be provided explicitly, in the data, or can be inferred from something external to the data, such as a port on which the data was received, or a time slot in which the data was carried, for example.

§1.2.3 Operations of Label Switched Paths

In one exemplary embodiment, the virtual link generated is a label-switched path ("LSP"). More specifically, recognizing that the operation of forwarding a packet, based on address information, to a next hop can be thought of as two steps—partitioning the entire set of possible packets or, other data to be communicated (referred to as "packets" in the specification without loss of generality), into a set of forwarding equivalence classes ("FECs"), and mapping each FEC to a next hop. As far as the forwarding decision is concerned, different packets which get mapped to the same FEC are indistinguishable. In one technique concerning label switched paths, dubbed "multiprotocol label switching" (or "MPLS"), a particular packet is assigned to a particular FEC just once, as the packet enters the label-switched domain (part of the) network. The FEC to which the packet is assigned is encoded as a label, typically a short, fixed length value. Thus, at subsequent nodes, no further header analysis need be done—all subsequent forwarding over the label-switched domain is driven by the labels.

FIG. 1 illustrates a label-switched path 110 across a network. Notice that label-switched paths 110 are (generally) simplex—traffic flows in one direction from a head-end label-switching router (or "LSR") 120 at an ingress edge to a tail-end label-switching router 130 at an egress edge. Generally, duplex traffic requires two label-switched paths—one for each direction. However, some protocols support bi-directional label-switched paths. Notice that a label-switched path 110 is defined by the concatenation of one or more label-switched hops, allowing a packet to be forwarded from one label-switching router (LSR) to another across the MPLS domain 110.

Recall that a label may be a short, fixed-length value carried in the packet's header (or may be inferred from something external to the data such as the port number on which the data was received (e.g., in the case of optical cross-connects), or the time slot in which the data was carried (e.g., in the case of SONET/SDH cross connects) of addressed data or of a cell) to identify a forwarding equivalence class (or "FEC"). Recall further that a FEC is a set of packets (or more generally data) that are forwarded over the same path through a network, sometimes even if their ultimate destinations are different. At the ingress edge of the network, each packet is assigned an initial label (e.g., based on all or a part of its layer 3 destination address). More specifically, referring to the example illustrated in FIG. 2, an ingress label-switching router 510 interprets the destination address 220 of an unlabeled packet, performs a longest-match routing table lookup, maps the packet to an FEC, assigns a label 230 to the packet and forwards it to the next hop in the label-switched path.

In the MPLS domain, the label-switching routers (LSRs) 220 ignore the packet's network layer header and simply forward the packet using label-swapping. More specifically, when a labeled packet arrives at a label-switching router (LSR), the input port number and the label are used as lookup keys into an MPLS forwarding table. (See, e.g., FIG. 5. Note that column 550 of FIG. 5 is a novel aspect of the present invention, and is therefore not provided in conventional tables.) When a match is found, the forwarding component retrieves the associated outgoing label, the outgoing interface (or port), and the next hop address from the forwarding table. The incoming label is replaced with the outgoing label and the packet is directed to the outgoing interface for transmission to the next hop in the label-switched path. FIG. 2 illustrates such label-switching by label-switching routers (LSRs) 220*a* and 220*b*.

When the labeled packet arrives at the egress label-switching router, if the next hop is not a label-switching router, the egress label-switching router discards ("pops") the label and forwards the packet using conventional longest-match IP forwarding. FIG. 2 illustrates such label discarding and IP forwarding by egress label-switching router 240.

§1.2.4 Establishing Label Switched Paths

In the example illustrated with reference to FIG. 2, each label-switching router had appropriate forwarding labels. However, these labels must be provided to the label-switching routers in some way.

There are four basic types of LSPs—static LSPs, label distribution protocol ("LDP") signaled LSPs, border gateway protocol ("BGP") signed LSPs and resource reservation protocol ("RSVP") signaled LSPs. Although each type of LSP is known to those skilled in the art, each is introduced below for the reader's convenience.

With static LSPs, labels are manually assigned on all routers involved in the path. No signaling operations by the nodes are needed.

With LDP signaled LSPs, routers establish label-switched paths (LSPs) through a network by mapping network-layer routing information directly to label switched paths. LDP operates in a hop-by-hop fashion as opposed to RSVP's end-to-end fashion. More specifically, LDP associates a set of destinations (route prefixes and router addresses) with each data link LSP. This set of destinations is called the Forwarding Equivalence Class ("FEC"). These destinations all share a common data link layer-switched path egress and a common unicast routing path. Each router chooses the label advertised by the next hop for the FEC and splices it to the label it advertises to all other routers. This forms a tree of LSPs that converge on the egress router.

With RSVP signaled LSPs, an ingress (i.e., head-end) router is configured. The head-end router uses (e.g., explicit path and/or path constraint) configuration information to determine the path. The egress (i.e., tail-end) and transit routers accept signaling information from the ingress (i.e., head-end) router. The routers of the LSP set up and maintain the LSP cooperatively. Any errors encountered when establishing an LSP are reported back to the ingress (i.e., head-end) router.

Using exterior gateway protocols, such as BGP-4, label information can be communicated between so-called "autonomous systems" (or "AS") and even within an AS. (See, e.g., "Request for Comments: 3107", by Y. Rekhter and E. Rosen, (Internet Engineering Task Force, May 2001). This RFC is incorporated herein by reference.) As is well understood in the art, an autonomous system is a network (e.g., composed of a set of routers) under the control of a single administrative entity, or within a given routing domain.

FIG. 3 illustrates the binding of a label to a forwarding equivalency class ("FEC") and the communication of such label binding information among peer nodes. In this example, suppose FEC "j" defines all packets that are destined for, or want to pass through, IP address 219.1.1.1. Notice that each of the nodes may be thought of as including a control component 330 and a forwarding component 310.

At the edge of the label-switched path 390, a node 240' assigns a label "2" to FEC j. This association is stored as label information 340c, as indicated by 350. Furthermore, this association is communicated to an upstream node (also referred to as a "peer" or "neighbor" node) 220b' as indicated by communication 352.

Node 220b' assigns its own label "9" to FEC j. This binding is similarly stored as label information 340b. Further, using the FEC j, the node 220b' binds its label "9" to the received label "2", and stores them as an IN label 322b and an OUT label 324b forwarding information 320b, as indicated by 354. Furthermore, its 220b' association is communicated to an upstream node (also referred to as a "peer" or "neighbor" node) 220a' as indicated by communication 356.

Node 220a' assigns its own label "5" to FEC j. This binding is similarly stored as label information 340a. Further, using the FEC j, the node 220a' binds its label "5" to the received label "9", and stores them as an IN label 322a and an OUT label 324a forwarding information 320ab, as indicated by 358. Furthermore, its 220a' association is communicated to an upstream node (not shown) as indicated by communication 359.

This process of using the FEC to bind a label with a received label, as well as communicating a label to a peer or neighbor node, results in the establishment of a label-switched path, such as that illustrated in FIG. 2.

§1.2.5 Responding to "Failures" in a Label Switched Path

In the following, neighboring routers in a label switched paths may be referred to as "peers" or "neighbors". If the interface of a router, the link to its neighbor, or an associated interface of the neighbor goes down (i.e., doesn't function), the router can reroute packets, for example using methods such as those described in U.S. patent application Ser. No. 09/354,640, entitled "METHOD AND APPARATUS FOR FAST REROUTE IN A CONNECTION-ORIENTED NETWORK," filed on Jul. 15, 1999. This application is incorporated herein by reference.

Sometimes, a control component part of a router in a label switch path, or a part of the control component, will restart. Such a restart may be caused, for example, by upgrading software and/or hardware of the control components, the control component receiving unexpected (path signaling) messages from its neighbor(s), the control component failing to receive expected (path signaling) messages from its neighbor(s), etc. Whatever the cause of the restart, the restarting node will typically purge its forwarding information (Recall, e.g., 320 of FIG. 3.), and will typically lose label information (Recall, e.g., 330 of FIG. 3.). For example, referring back to FIG. 3, if the control component 330b of node 220b' restarts, it will purge stored forwarding information 320b and will lose label information 340b. Furthermore, this restart affects other routers in the label-switched paths. For example, when nodes 220a' and 240' learn that the node 220b' is restarting, they will purge forwarding information 320a/320c related to the path through node 220b'.

This scenario has at least two disadvantages. First, as shown in FIG. 3, some routers have forwarding components that can, at least theoretically, continue forwarding packets even when their control component, or a part thereof, is restarting. (For example, routers from Juniper Networks Inc. of Sunnyvale, Calif. have a packet forwarding engine and a routing engine.) Second, after the restart is complete, the node and its neighbors need to repopulate their forwarding information. During this period, the label switched path(s) through node 220b' cannot be used.

It is desired to minimize the effects of such restart(s) on the flow of packets over the label switched path.

§2. SUMMARY OF THE INVENTION

The present avoids purging label-based forwarding information in the event that the control component (or a part of a control component) of one node in a path is restarting, provided that the node is capable of preserving its label-based forwarding information across the restart of its control component. The present invention may do so by (i) having nodes with the capability to preserve forwarding information across a control component restart advertise this fact to its neighbors or peers, and (ii) in the event that a node is restarting, having the restarting node and its peers preserve and use "stale" (not updated) forwarding information for a limited time.

In one embodiment of the invention, the advertisement may include a length of time that the restarting node is willing to keep "stale" (not updated) forwarding information, or perform forwarding operation using such "stale" forwarding information.

In one embodiment of the invention, after the restart of the control component, but before "stale" forwarding information is purged from the restarting node, label binding information may be received from peer or neighbor nodes and label information for use by the control component can be determined, e.g., based on the received label-binding information and the preserved forwarding information. Such newly determined label information may be processed by the restarting node in one of two basic ways. In the first way, the restarting node "refreshes" the "stale" forwarding information by updating it based on the newly determined label information. Label binding information advertised by the restarting node is similarly determined based on the received label binding information and the stale forwarding information. In the second way, the restating node separately maintains both the "stale" forwarding information and the new forwarding information (determined based on the newly determined label information) for a period of time, before switching over to only using the new forwarding information (at which time the "stale" forwarding information may be purged.

In one embodiment of the invention, peer nodes to a restarting node with restart capability may continue forwarding packets to the restarting node, and may continue to use "stale" (not updated) label information received from the restarting node, even after it learns that the node is restarting or has restarted its control component. A peer node may limit that time that it will continue forwarding packets to the restarting node, and may limit the time that it will continue to use "stale" label information received from the restarting node. This time limit may be (a) derived internally, independent of any information received from the restarting node, (b) derived from an expected restart time advertised by the restarting node before the restart, (c) derived from a recovery time for which a node, that has already restarted its control component, will hold its forwarding state, or (d) a derived as a function of any combination of the foregoing.

§3. BRIEF DESCRIPTION OF THE DRAWINGS

FIG. 5 is an exemplary data structure for storing label-switched paths.

§4. DETAILED DESCRIPTION

Figure 1:
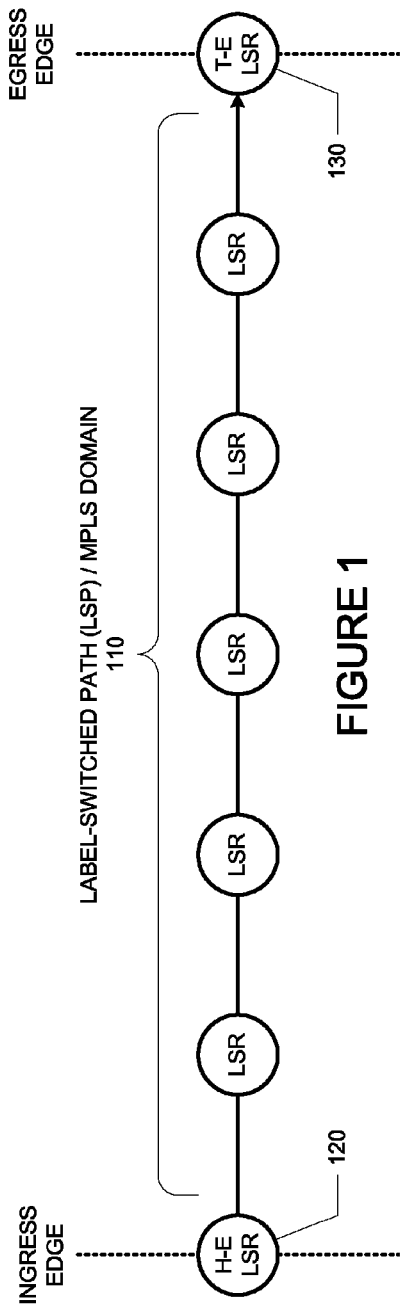
FIG. 1 illustrates a label-switched path including a head-end (or ingress) label-switching router, intermediate label-switching routers, and a tail-end (or egress) label-switching router.
Figure 2:
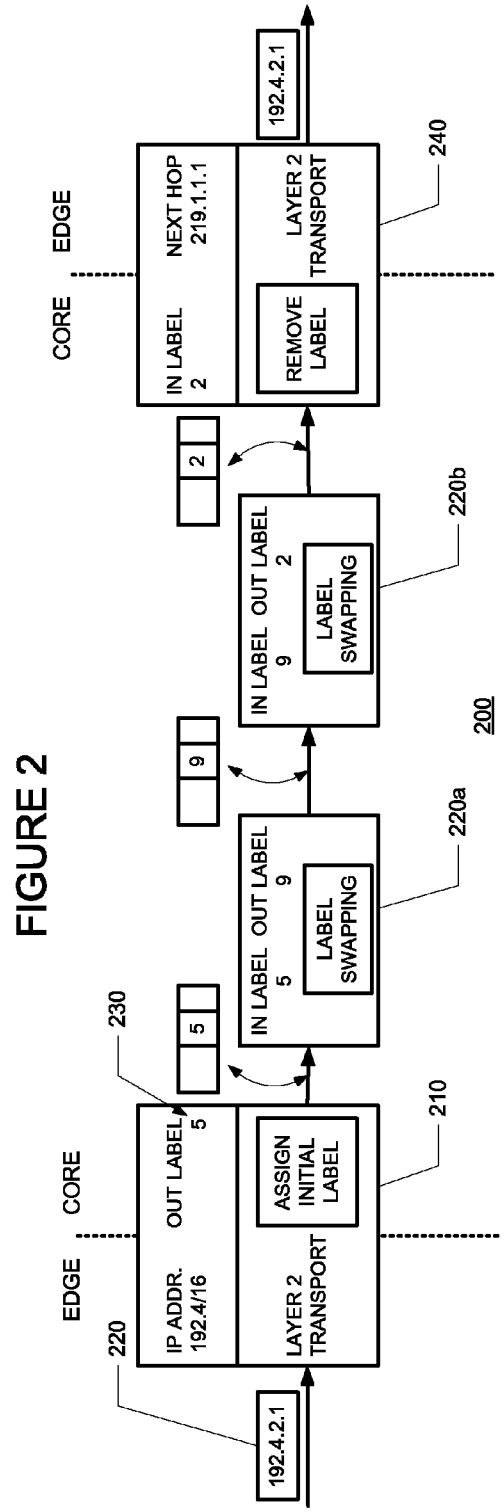
FIG. 2 illustrates label assignment, switching and removal by label-switching routers of a label-switched path.

The present invention involves methods, apparatus and data structures for minimizing the effect of restarting protocols related to label switched paths, on such label switched paths. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, exemplary environments in which the present invention may operate is described in §4.1. Then high-level operations that may be performed by the present invention are introduced in §4.2. Thereafter, exemplary apparatus, methods and data structures that may be used to effect those high-level operations are described in §4.3. Finally, some conclusions regarding the present invention are set forth in §4.4.

First, however, some terms used in the specification are defined.

FORWARDING-STATE HOLDING TIME: A time for which a node will hold "stale" label-based forwarding information that has been preserved across the restart of the node's control component, or a part of its control component related to label-switched paths. The forwarding-state holding time is preferably internal to the node (e.g., not signaled from an external node), and is preferably configurable.

LABEL-PATH MESSAGE: A message that includes a label-path couple. Examples of a label-path message include a {route, label, next hop} association used in a BGP "UPDATE" message, a {FEC, label} association used in an LDP "LABEL MAPPING" message, and a {label, RSVP state} association used in an RSVP "PATH" message.

LOCAL TIME: A preferably configurable time, that a peer or neighbor of a restarting node will hold stale forwarding information. This time starts when the node learns or infers that its peer or neighbor is restarting.

RECOVERY TIME: The time that a restarting node is willing to retain label-based forwarding information preserved across the restart of its control component, or a part of its control component related to label-switched paths.

RESTART CAPABILITY MESSAGE: A message that advertises a node's capability to preserve forwarding state information across the restart of its control component, or a part of its control component related to label-switched paths.

RESTART INITIATED: The time at which a node initiates the restart of its control component, or a part of its control component related to label-switched paths.

RESTART OF CONTROL COMPONENT COMPLETED: The time at which a node completes the restart of its control component, or a part of its control component related to label-switched paths, but before label-based forwarding information is refreshed or updated.

RESTART COMPLETED: After the restart of the control component is complete, after the forwarding state holding time, the restart is deemed complete. At this point, "stale" entries will have been updated, and deleted otherwise.

RESTART TIME: The time that a node would like its peers to "wait" upon learning that the node is "down" (e.g., restarting). While a peer waits, it should retain label-based forwarding information received from the "down" (e.g., restarting) node. The restart time should be long enough for the control component, or the part of the control component related to label-switched paths, to restart and to resume normal communications with the peer node.

STALE: Forwarding information related to a path is stale if it was preserved across the restart of the control component, or the part of the control component related to label-switched paths, of a node in the path.

§4.1 Environment in which the Present Invention May Operate

The present invention may be used in nodes for forwarding addressed data, such as packets or other data, that have a control component and a forwarding component, wherein the forwarding component can operate independently of the control component. At least one of the nodes will be capable of preserving forwarding state information in the event of a restart of its control component. The node may be a router that supports label-switched paths.

Figure 4:
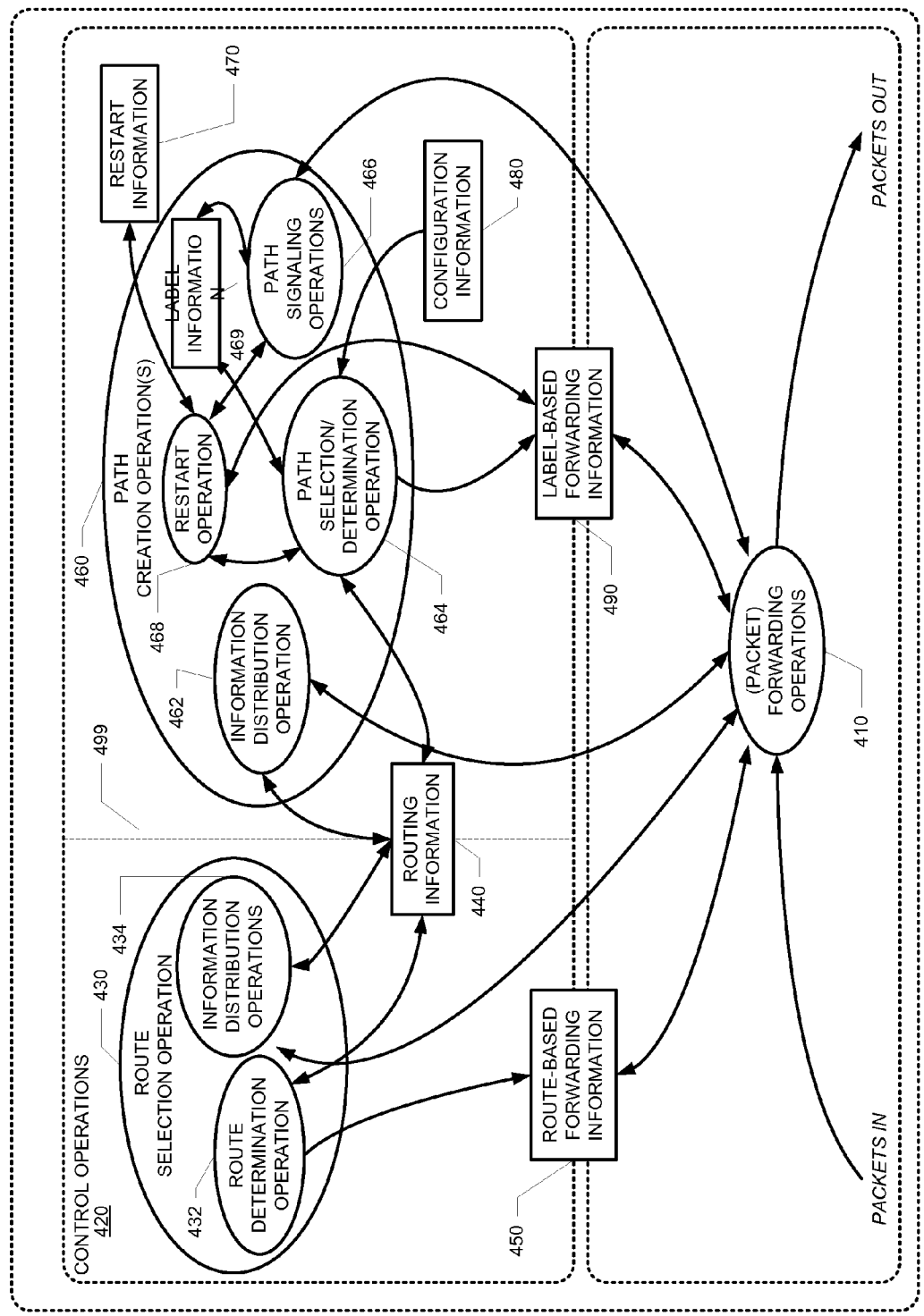
FIG. 4 is a bubble chart diagram of a router in which the present invention may be used.

FIG. 4 is a bubble-chart of an exemplary router 400 in which the present invention may be used. The router 400 may include a packet forwarding operation 410 and a control (e.g., routing) operation 420. The packet forwarding operation 410 may forward received packets based on route-based forwarding information 450 and/or based on label-based forwarding information 490, such as label-switched path information.

Regarding the control operations 420, the operations and information depicted to the right of dashed line 499 are related to creating switched paths, such as label-switched paths, while the operations and information depicted to the left of the dashed line 499 are related to creating routes. These operations and information needn't be performed and provided, respectively, on all routers of a network.

The route selection operations 430, which are not particularly relevant to the present invention, may include information distribution operations 434 and route determination operations 432. The information distribution operations 434 may be used to discover network topology information, store it as routing information 440, and distribute such information. The route determination operation 432 may use the routing information 440 to generate route-based forwarding information 450.

The path creation operation(s) 460 may include an information distribution operation 462, a path selection/determination operation 464, path signaling operations 466, and a restart operation 468. The information distribution operation 462 may be used to obtain information about the network, store such information as routing information 440, and distribute such information. The path determination/selection operation 464 may use the routing information 440, label information 469, and/or configuration information 480 to generate label-based forwarding information 490, such as label-switched paths for example. Path signaling operations 466 may be used to accept, store and disseminate signal label-based forwarding information (e.g., paths) 469. The restart operation 468 uses restart information 470 to enable a graceful restart in the event of a control component restart. Thus, the present invention is concerned with the restart operation 468 and its interactions with, and/or extensions to, the path selection/determination operation 464, the path signaling operation 466, and the label-based forwarding information 490.

§4.2 High-Level Operations that may be Performed by the Present Invention

One high-level operation of the present invention may be to avoid purging label-based forwarding information in the event that the control component of one node in a path is restarting, provided that the node is capable of preserving its label-based forwarding information across the restart of its control component. The present invention may do so by (i) having nodes with the capability to preserve forwarding information across a control component restart advertise this fact to its neighbors or peers, and (ii) in the event that a node is restarting, having the restarting node and its peers preserve "stale" (not updated) forwarding information for a limited time.

The advertisement may include a length of time that the node is willing to keep "stale" (not updated) forwarding information, or perform forwarding operation using such "stale" forwarding information. Both the restarting node and the peer/neighbor node(s) may generate such advertisements.

After the restart of the control component, but before "stale" forwarding information is purged from the restarting node, label binding information may be received and label information used by the control components of the node may be determined from the received label binding information and the stale forwarding information. The forwarding table may be updated accordingly, and the determined label information may be advertised in accordance with the applicable protocol. Such received label binding information may be processed by the restarting node in one of two basic ways. In the first way, the restarting node "refreshes" the "stale" forwarding information by updating it based on the newly determined label information. In the second way, the restarting node separately maintains both the "stale" forwarding information and the refreshed forwarding information for a period of time, before switching over to only using the refreshed and new forwarding information (at which time the "stale" forwarding information may be purged).

Peer nodes to a restarting node with restart capability may continue forwarding packets to the restarting node, and may continue to use "stale" (not updated) label information received from the restarting node, even after it learns that the node is restarting or has restarted its control component. A peer node may limit that time that it will continue forwarding packets to the restarting node, and may limit the time that it will continue to use "stale" label information received from the restarting node. This time limit may be (a) derived internally, independent of any information received from the restarting node, (b) derived from an expected restart time advertised by the restarting node before the restart, (c) derived from a recovery time for which a node, that has already restarted its control component, will hold its forwarding state, or (d) a derived as a function of any combination of the foregoing.

§4.3 Methods, Data Structures, and Apparatus

In the following, exemplary methods and data structures for effecting the operations summarized in §4.2 are described in §4.3.1 for a general case, in §4.3.2 for a case where BGP is used as a signaling protocol, in §4.3.3 for a case where LDP is used as a signaling protocol, and in §4.3.4 for a case where RSVP is used as a signaling protocol. The specific cases may depart from the general case in some instances. Then, exemplary apparatus that may be used to effect the functions summarized in §4.2 are described in §4.3.5.

§4.3.1 General Case

Two alternative embodiments are described. In a first, described in §4.3.1.1, stale forwarding state information is refreshed based on information received from peer node(s) during a certain time period and the stale forwarding state information itself, after which any remaining stale (not refreshed) information is deleted. In a second, alternative, embodiment, described in §4.3.1.2, stale forwarding state information is used during a certain time period, after which it is deleted. During that time period, new, possibly redundant forwarding state information may have been determined from label binding information received from peer node(s) and the stale forwarding state information itself, and stored, along with the "stale" information. Thus, the first alternative may be thought of as refreshing stale forwarding state information, while the second alternative may be thought of as storing redundant (stale and new) forwarding state information, permitting the use stale (or new) forwarding state information for a certain period of time, after which only new forwarding state information may be used.

§4.3.1.1 First Alternative

Figure 7:
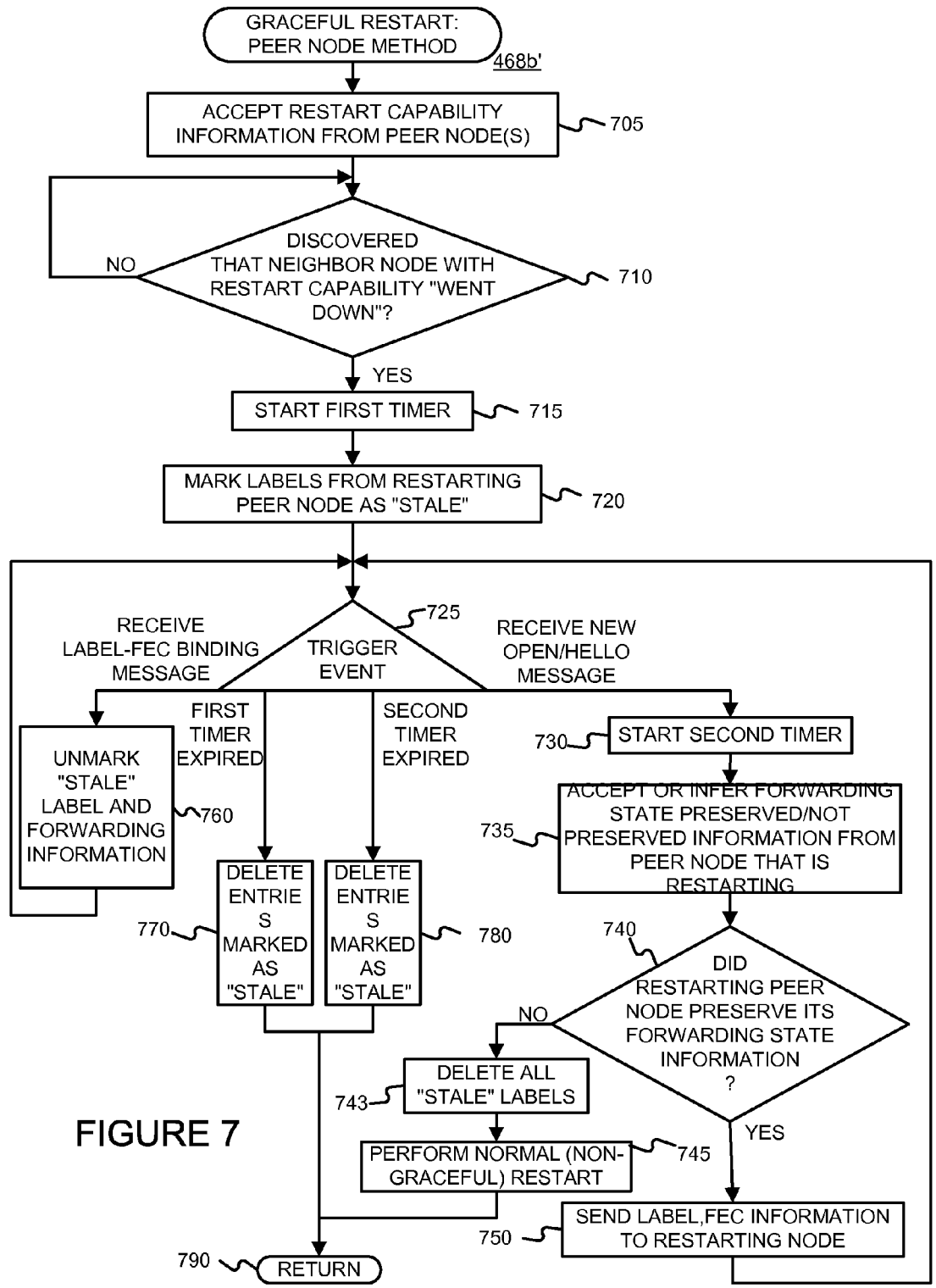
FIG. 7 is a flow diagram of an exemplary method for providing a neighbor or peer of a restarting node with a graceful restart.
Figure 8:
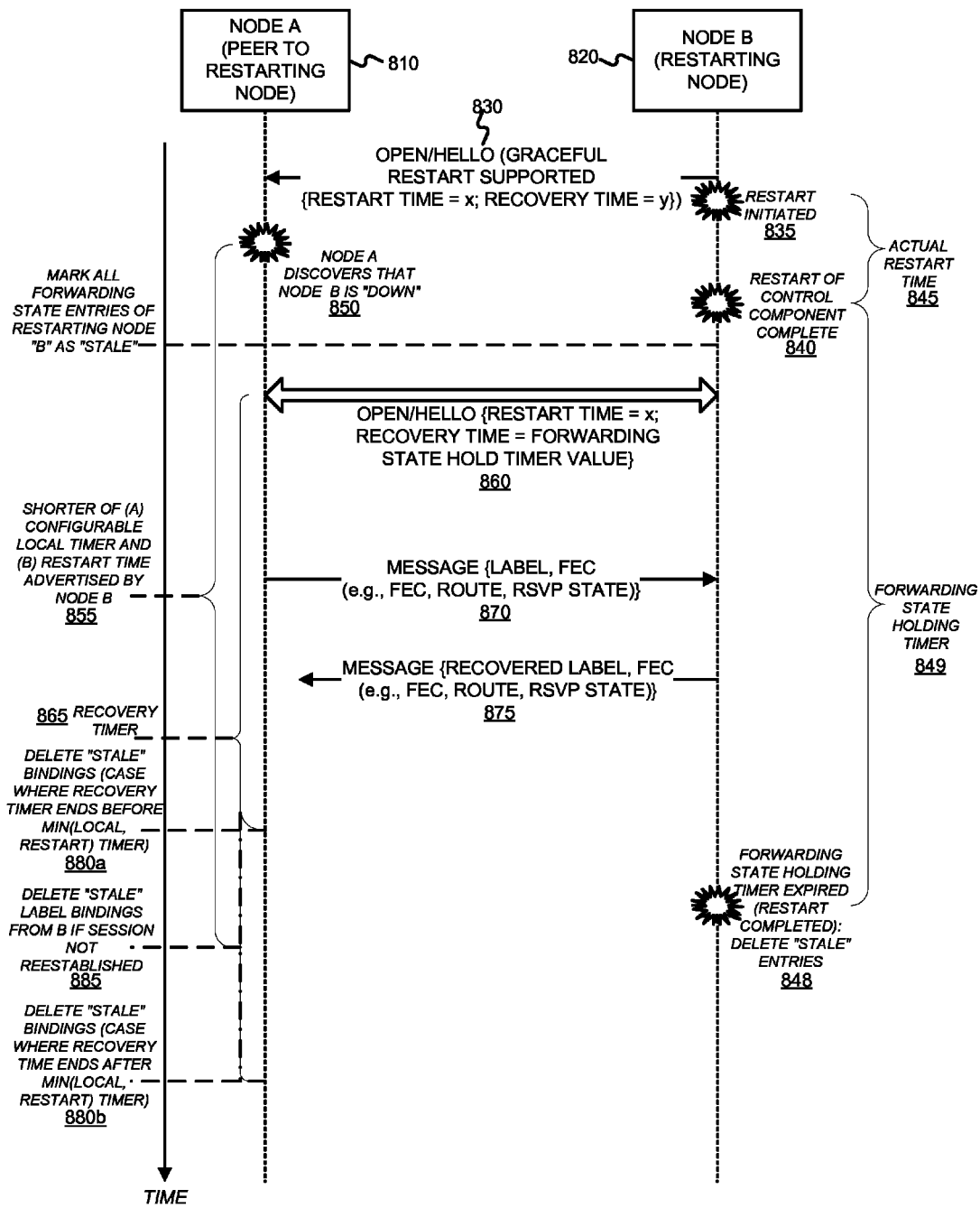
FIG. 8 is a timing diagram illustrating an example of operations of a restarting node and a neighbor or peer of the restarting node.

Exemplary methods and data structures that may be used to effect at least some aspects of the present invention are now described with reference to FIGS. 6-8. More specifically, FIG. 6 is a flow diagram of a graceful restart method 468a' that may be effected by a restarting node, FIG. 7 is a flow diagram of a graceful restart method 468b' that may be effected by a node that peers with (e.g., a neighbor node to) the restarting node, and FIG. 8 is a messaging diagram that illustrates communications between these two nodes.

Figure 6:
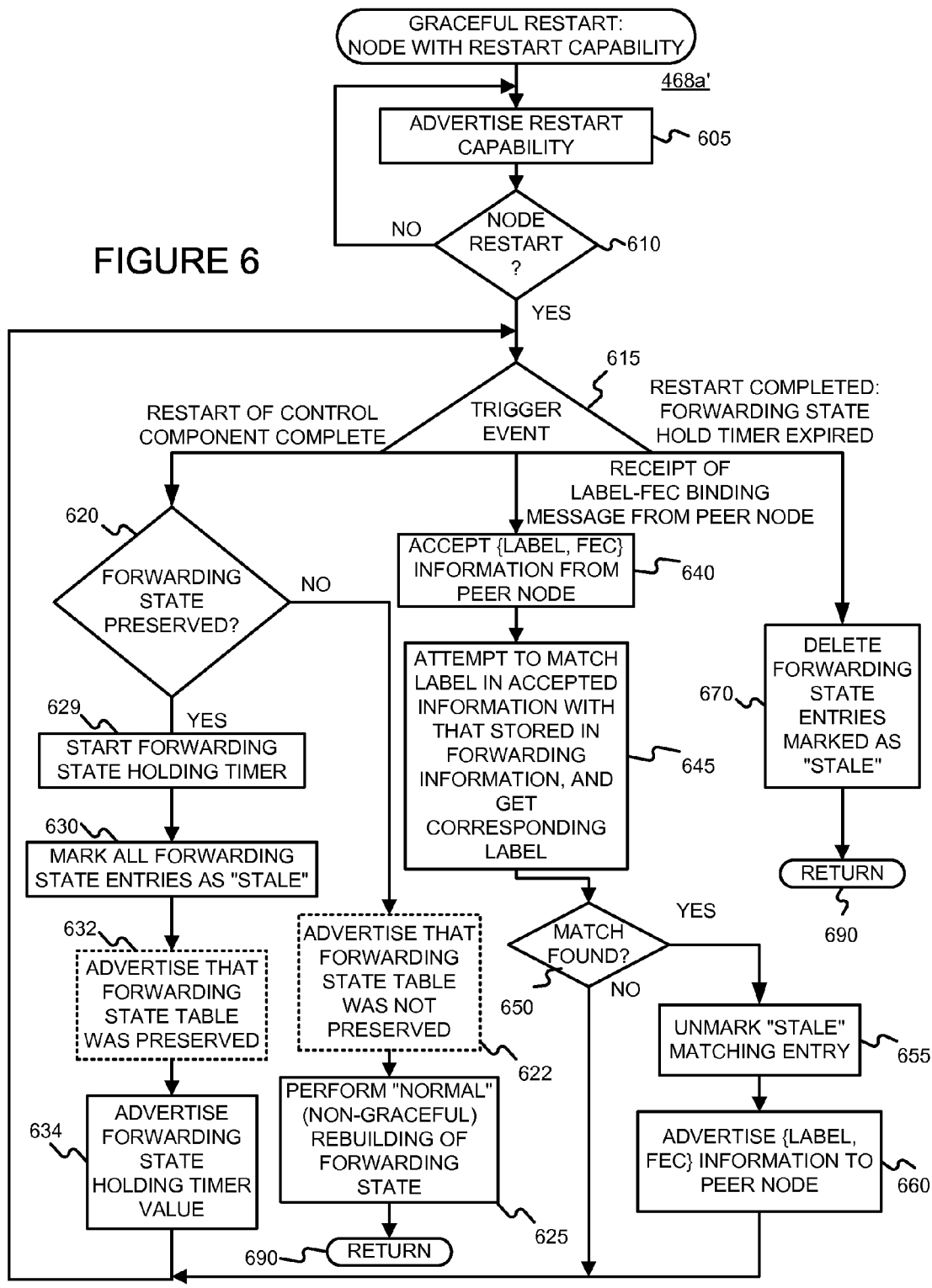
FIG. 6 is a flow diagram of an exemplary method for providing a restarting node with a graceful restart.

Referring to FIG. 6, before restart is ever initiated, a node may advertise its capability to preserve forwarding information across a restart as indicated by block 605. Note that a capability to preserve forwarding information across a restart is not a guarantee that it will do so successfully. In one exemplary embodiment, this so-called "restart capability" may be advertised within typical open or hello messages often exchanged between peer label-switching routers ("LSRs") in a label-switched path ("LSP"). Referring to FIG. 8, assuming that node B 820 has a graceful restart capability, and that node A 810 peers with node B 820 in an LSP, message 830 may signal this capability of node B 820 to node A 810. As shown, the message 830 may also include a restart time and/or a recovery time.

Referring back to FIG. 6, if the node doesn't restart, it may periodically resend its restart capacity (though this isn't necessary) as indicated by decision branch point 610. When the node restarts, the method 468a' continues to 615 where various conditions are monitored for the occurrence of an event or events that are used to trigger further acts by the method 468a'. Typically, the trigger events listed from left to right will occur in that temporal order.

If the restart of the node's control component (or part of the control component related to label-switched paths) is completed (See 840 of FIG. 8.), the node will determine whether it was able to preserve its forwarding state as indicated by conditional branch point 620. If not, this fact may be advertised to peer node(s) as indicated by act 622, and the node will rebuild (repopulate) its forwarding state in a normal (i.e., non-graceful) way, as indicated by block 625, before the method 468a' is left via RETURN node 690. If, on the other hand, the node was able to preserve its forwarding state across the restart, it may start a forwarding state holding timer, as indicated by block 629, mark its forwarding state entries as "stale", as indicated by block 630, may advertise that it was able to preserve its forwarding state, as indicated by block 632, and may advertise the present value of its forwarding state holding timer as a recovery time, as indicated by block 634, before the method 468a' returns to 615. Note that either act 622, act 632, or both may be provided. In the event that only the fact that forwarding state information was not preserved is advertised, peer nodes could infer that such forwarding state information was preserved in the absence of such a message. On the other hand, in the event that only the fact that forwarding state information was preserved is advertised, peer nodes could infer that such forwarding state information was not preserved in the absence of such a message.

Figure 3:
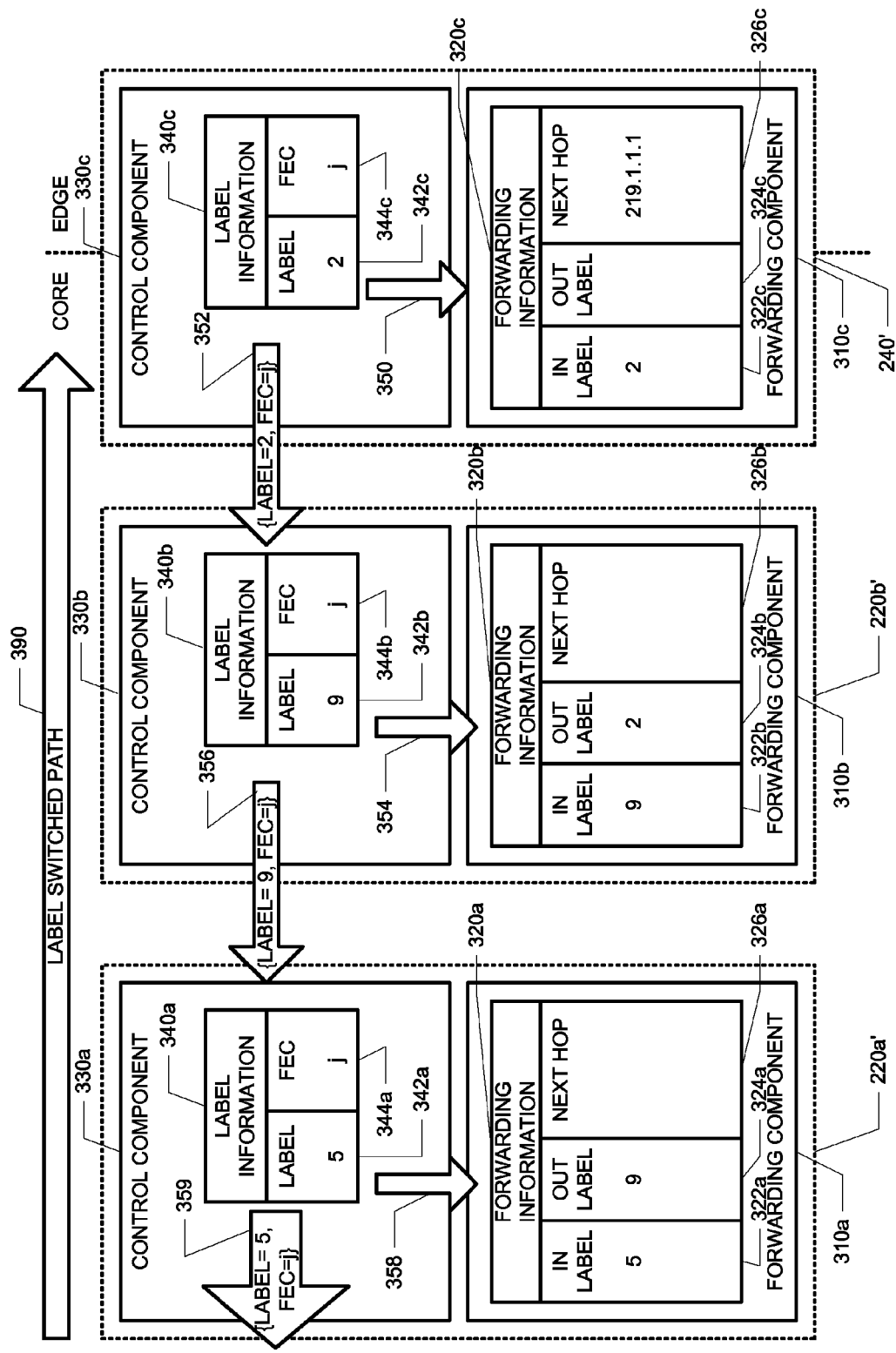
FIG. 3 illustrates the use of FECs to bind labels that may be generated and signaled by routers.

Referring to 615, if the node receives a label-FEC binding message from a peer node (See, e.g., 870 of FIG. 8.), the node may accept that information as indicated in block 640 and attempt to match the label in the message to an "out" (or "in") label in its forwarding state information as indicated by block 645. If no match is found, the method 468a' may continue back to 615 as indicated by conditional branch point 650. If, on the other hand, a match is found, the entry of the forwarding state information with the "out" (or "in") label matching the received label is "unmarked" (no longer indicated as stale) as indicated by block 655, and the corresponding "in" (or "out") label of the entry is advertised, with the FEC binding (e.g., FEC, RSVP state, route) received, to peer node(s) as indicated by block 660 (See, e.g., 875 of FIG. 8.), before the method 468a' proceeds back to 615. Referring back to FIG. 3, upon restart of the control component 330, the restarting node's 810 label information 340 will have been cleared. Thus, matching the received "out" (or "in") label to the "in" (or "out") label of the forwarding information 320, and associating that "in" (or "out") label with the FEC binding advertised with the received "out" (or "in") label, the node 810 can repopulate its label information 340.

Referring to 615, if the forwarding state holding timer (Recall block 629.) expires (See, e.g., 848 of FIG. 8), the method 468a' will delete all forwarding state information marked "stale", as indicated by block 670, before the method 468a' is left via RETURN node 690.

The foregoing described an exemplary method 468a' that may be used by the restarting node. Now, an exemplary method 468b' that may be used by a peer (e.g., a neighbor) node to a restarting node, is described with reference to FIGS. 7 and 8.

FIG. 7 is a flow diagram of a graceful restart method 468b' that may be effected by a node 810 that peers with (e.g., a neighbor node to) the restarting node 820. As indicated by block 705, it 810 accepts restart capability information from a peer node(s) 820. (Recall, e.g., 830 of FIG. 8.) If the neighbor node 820 restarts, the peer node 810 should discover that the restarting node 820 is "down" (though it may not know the specific reason for the node being down). (See event 850 of FIG. 8.) If the peer node 810 discovers that its peer 820, that has advertised its restart capability, is "down", the node 810 may start a first timer, and mark label-FEC bindings received from the restarted peer node 820 and the label forwarding state created from such bindings as "stale", as indicated by conditional branch point 710 and blocks 715 and 720. As indicated by 855 of FIG. 8, in one exemplary embodiment, this first timer may be the shorter of (a) a predetermined local timer, preferably configurable, and (b) the restart time earlier advertised by the restarting node 820. The predetermined local timer should correspond to the amount of time that the node 810 is willing to use "stale" forwarding information. Referring back to FIG. 3, since the control component of the peer node 810 is not restarting, it can mark is label information 340 as stale without affecting its forwarding information 320.

The method 468b' continues to 725 where various conditions are monitored for the occurrence of an event or events that are used to trigger further acts by the method 468b'. In the event that the peer node 810 receives a new (e.g., open, hello) message from the restarting node 820 (See, e.g., message 860 which occurs after the restart of the control component is complete 840.), it starts a second timer as indicated by block 730. As indicated by 865 of FIG. 8, this second timer may be the value of a recovery timer that was/is advertised (See, e.g., 860) by the restarting node 820. Recall that this recovery time advertised may have been set, by the restarting node 820, to the then present value of the forwarding state holding timer. (Recall, e.g., block 634 of FIG. 6.) Further, as indicated by block 735, the node 810 can accept (or infer) an indication of whether or not the forwarding state information was preserved by the restarting node 820. Referring to conditional branch point 740, if the restarting node 820 didn't (e.g., was unable to) preserve its forwarding state information, then the peer node 810 can simply delete all of the "stale" label-FEC binding information and the label forwarding state created from such bindings, as indicated by block 743, and perform normal (e.g., non-graceful) restart operations as indicated by block 745, before the method 468b' is left via RETURN node 790. Referring back to conditional branch point 740, if, on the other hand, the restarting node 820 did preserve its forwarding state information, then the peer node 810 may send {label, FEC binding} information to the restarting node 820, as indicated by block 750, before the method 468b' continues back to 725. Block 750 is indicated by communication 870 of FIG. 8.

Referring to 725, if the peer node 810 receives a {label, FEC binding} association message from (or about) the restarting peer node 820 (See, e.g., communication 875 of FIG. 8, and recall act 660 of FIG. 6.), it may unmark the "stale" FEC bindings received from the restarted peer node 820 and the "stale" label forwarding state created from such bindings as indicated by block 760, before the method 468*b*' continues back to 725.

Once again referring to 725, if the first timer expires, stale entries of the label information, and any stale forwarding information derived from such stale label information, may be deleted, as indicated by block 770, before the method 468*b*' is left via RETURN node 790. The expiration of the first timer means that either (a) the peer node 810 has used the stale forwarding information for as long as it is willing to do so, or (b) the peer node 810 believes that the restarting node 820 will purge its "stale" forwarding information.

Once again referring to 725, if the second timer expires, stale entries of the label information, and any stale forwarding information derived from such stale label information, may be deleted, as indicated by block 780, before the method 468*b*' is left via RETURN node 790. The expiration of the second timer means that the restarting node 820 will have purged (or will immediately purge) its "stale" forwarding information. (See, e.g., event 848 of FIG. 8.)

Regarding the first and second timers, as shown in FIG. 8, note that the first timer 855 can expire after the second timer 880*a*, or before the second timer 880*b*.

As can be appreciated, in this first alternative, stale (label and related) forwarding information is refreshed by information received from peer node(s) during a certain time period, after which any remaining stale (not refreshed) information is deleted. The second, alternative, embodiment is now described in §4.3.1.2 below. In that second alternative embodiment, stale (label and related) forwarding information is used during a certain time period, after which it is deleted. During that time period, new, possibly redundant (label and) forwarding information may have been received from peer node(s) and stored, along with the "stale" information.

§4.3.1.2 Second Alternative

In this second alternative, stale (label and related) forwarding information is used during a certain time period, after which it is deleted. During that time period, new, possibly redundant, label binding information may have been received from peer node(s), new forwarding information may have been determined based on the received label binding information and the old forwarding information, and such newly determined forwarding information may be stored, along with the "stale" information. To use this second alternative, the restarting node will have at least as many unallocated labels as allocated labels, and will be able to identify the allocated labels. The allocated labels define the forwarding state that the node preserved across the restart of its control component, while the unallocated labels are used to allocate new labels after the restart of the control component is completed.

Figure 9:
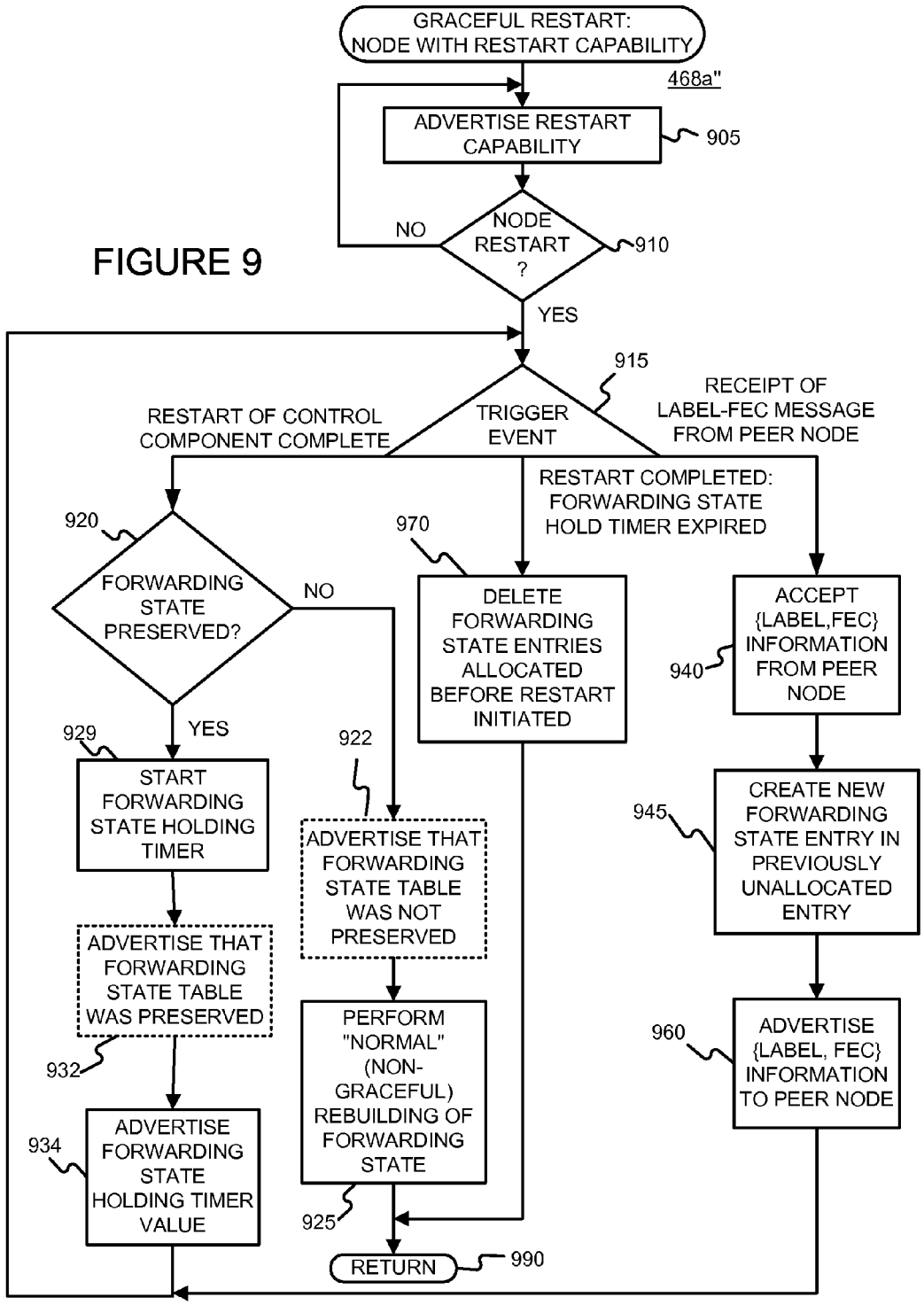
FIG. 9 is a flow diagram of an alternative exemplary method for providing a restarting node with a graceful restart.

FIG. 9 is a flow diagram of another graceful restart method 468*a*" that may be effected by a restarting node. Before restart is ever initiated, a node may advertise its capability to preserve forwarding information across a restart as indicated by block 905. Again, a capability to preserve forwarding information across a restart is not a guarantee that it will do so successfully. If the node doesn't restart, it may periodically resend its restart capacity (though this isn't necessary) as indicated by decision branch point 910. When the node restarts, the method 468*a*" continues to 915 where various conditions are monitored for the occurrence of an event or events that are used to trigger further acts by the method 468*a*'.

If the restart of the node's control component (or part of the control component related to label-switched paths) is completed, the node will determine whether it was able to preserve its forwarding state as indicated by conditional branch point 920. If not, this fact may be advertised to peer node(s) as indicated by block 922, and the node will rebuild (repopulate) its forwarding state in a normal (i.e., non-graceful) way, as indicated by block 925, before the method 468*a*" is left via RETURN node 990. If, on the other hand, the node was able to preserve its forwarding state across the restart, it may start a forwarding state holding timer, as indicated by block 929, may advertise that it was able to preserve its forwarding state, as indicated by block 932, and may advertise the present value of its forwarding state holding timer as a recovery time, as indicated by block 934, before the method 468*a*" returns to 915. Note that either act 922, act 932, or both may be provided. In the event that only the fact that forwarding state information was not preserved is advertised, peer nodes could infer that such forwarding state information was preserved in the absence of such a message. On the other hand, in the event that only the fact that forwarding state information was preserved is advertised, peer nodes could infer that such forwarding state information was not preserved in the absence of such a message.

Referring to 915, if the node receives a label-FEC binding message from a peer node, the node may accept that information as indicated in block 940 and may use the FEC to bind its newly generated "in" (or "out") label, with the received "out" (or "in") label to create a new forwarding state information entry, as indicated by block 945. As shown in block 960, the node may advertise its newly generated "in" (or "out") label with the FEC (e.g., FEC, RSVP state, route) to peer node(s), before the method 468*a*" proceeds back to 915. Actually, block 960 can be effected using normal label switched path signaling protocols.

Referring to 915, if the forwarding state holding timer (Recall block 929.) expires, the method 468*a*" will delete all forwarding state information entries that were allocated before the restart was initiated, as indicated by block 970, before the method 468*a*" is left via RETURN node 690. Alternatively, these entries can be indicated as not for use, and as being unallocated (i.e., available).

As can be appreciated from the foregoing, stale (previously allocated) forwarding state information is used during a certain time period, after which it is deleted. During that time period, new, possibly redundant forwarding state information may have been received from peer node(s) and stored (in previously unallocated entries), along with the "stale" information (in the previously allocated entries).

§4.3.2 Border Gateway Protocol (BGP) Used to Signal Labels

Some have proposed using the border gateway protocol (See, e.g., "A Border Gateway Protocol 4 (BGP-4)", *Request for Comments* 1771, pp. 1-57 (Internet Engineering Task Force, March 1995) (Hereafter referred to as "RFC 1771", and incorporated herein by reference.)) as a way to carry label information (See, e.g., "Carrying Label Information in BGP-4", *Request for Comments* 3107, pp. 1-8 (Internet Engineering Task Force, May 2001) (Hereafter referred to as "RFC 3107", and incorporated herein by reference.)). Referring back to FIG. 8, in one exemplary embodiment, the communication 830 advertising a node's restart capability can take place within a BGP "open" message, a node can discover that its peer node is down 850 based on BGP "keep alive" messages, communicating whether or not a restarting node was able to preserve its forwarding state information can take place in a BGP "open" message", and communicating new {route, label, next hop} information 870,875 can take place within BGP "update" messages.

The Internet draft, "Graceful Restart Mechanism for BGP", draft-ietf-idr-restart-01.txt (Internet Engineering Task Force) (Hereafter referred to as "The BGP route graceful restart draft", and incorporated herein by reference.) describes a mechanism for BGP that would help minimize the negative effects on routing caused by BGP restart. One embodiment of the present invention extends this mechanism to also minimize the negative effects on MPLS forwarding when BGP is used to carry MPLS labels (Recall, e.g., RFC 3107.). This embodiment of the invention is agnostic with respect to the types of the addresses carried in the BGP NLRI. Therefore it can work with any of the address familities that could be carried in BGP (e.g., IPv4, IPv6, etc.).

§4.3.2.1 First Alternative Embodiment for Use with Border Gateway Protocol (BGP)

In this embodiment, the control plane restart of a node includes the restart of its BGP component in the case where BGP is used to carry MPLS labels (and the node is capable of preserving its MPLS forwarding state across the restart). This embodiment of the invention permits one to avoid perturbing the LSPs going through a restarting node (and specifically, the LSPs established by BGP).

An LSR that supports the graceful restart mechanism of the present invention advertises this to its peer(s) by using the Graceful Restart Capability as specified in the BGP route graceful restart draft. The SAFI in the advertised capability should indicate that NLRI carries not just address prefixes but labels as well. This is a special case of block 605 of the general method 468a' of FIG. 6.

After the restart of the node's control component BGP part, it may follow the procedures as specified in the BGP route graceful restart draft. In addition, if the node preserved its MPLS forwarding state across the restart of the control component, it advertises this to its peer(s) (e.g., neighbors) by appropriately setting the Flag field in the Graceful Restart Capability for all applicable AFI/SAFI pairs. This is a special case of block 632 of the general method 468a' of FIG. 6. For the sake of brevity, in this section "MPLS forwarding state" means either <incoming label→(outgoing label, next hop)>, or <address prefix→(outgoing label, next hop)> mapping. The forwarding state means MPLS forwarding state. The restarting node does not need to preserve its IP forwarding state across the restart of its control component. Once the restarting node completes its route selection (as specified in Section 6.1 of the BGP route graceful restart draft), then in addition to the procedures specified in the BGP route graceful restart draft, the restarting node operates differently under three alternative scenarios.

Scenario 1

The first scenario is where (a) the best route selected by restarting node was received with a label, (b) that label is not an Implicit NULL, and (c) the node advertises this route with itself as the next hop. In this first case, the restarting node searches its MPLS forwarding state (the one preserved across the restart) for an entry with <outgoing label, Next-Hop> equal to the one in the received route. This is a special case of block 645 of FIG. 6. If such an entry is found, the node no longer marks the entry as stale. This is a special case of 650 and 655 of FIG. 6. In addition, if the entry is of type <incoming label, (outgoing label, next hop)> rather than <prefix, (outgoing label, next hop)>, the node uses the incoming label from the entry when advertising the route to its neighbors. This is a special case of block 660 of FIG. 6. If the found entry has no incoming label, or if no such entry is found, the node just picks up some unused label when advertising the route to its neighbors (assuming that there are peers (e.g., neighbors) to which the node has to advertise the route with a label).

Scenario 2

The second scenario is where (a) the best route selected by the restarting node was received either without a label, or with an Implicit NULL label, or the route is originated by the restarting node, (b) the node advertises this route with itself as the next hop, and (c) the node has to generate a (non Implicit NULL) label for the route. In this second case the node searches its MPLS forwarding state for an entry that indicates that the node has to perform label pop, and the next hop is equal to the next hop of the route in consideration. If such an entry is found, then the node uses the incoming label from the entry when advertising the route to its peer(s) (e.g., neighbors). If no such entry is found, the node just picks up some unused label when advertising the route to its peer(s) (e.g., neighbors).

The foregoing assumes that the restarting node generates the same label for all the routes with the same next hop.

Scenario 3

The third scenario is where the restarting node does not set BGP Next Hop to self. In this third case the restarting node, when advertising its best route for a particular NLRI, just uses the label that was received with that route. If the route was received with no label, the node advertises the route with no label as well.

Peer Nodes

Having described an exemplary method for a restarting node, an exemplary method for a peer (e.g., a neighbor) node(s) of a restarting node is now described. The peer node of a restarting node (the "receiving router" in terminology used in the BGP route graceful restart draft) follows the procedures specified in the BGP route graceful restart draft. In addition, the peer node should treat the MPLS labels received from the restarting node the same way as it treats the routes received from the restarting node (both prior and after the restart). More specifically, the peer node should replace the stale routes by the routing updates received from the restarting node. This involves replacing/updating the appropriate MPLS labels. This is a special case of block 760 of FIG. 7. In addition, if the Flags in the Graceful Restart Capability received from the restarting node indicate that the restarting node wasn't able to retain its MPLS state across the restart of its control plane, the peer node should immediately remove all the NLRI and the associated MPLS labels that it previously acquired via BGP from the restarting node. This is a special case of block 743 of FIG. 7.

Once a peer node creates a <label, FEC> binding, it should keep the value of the label in this binding for as long as the node has a route to the FEC in the binding. If the route to the FEC disappears, and then re-appears later, this may result in using a different label value, because when the route re-appears, the node would create a new <label, FEC> binding. Also, the label that was used for the original (old) label binding could be re-used for some other label binding after the old binding is deleted (due to the disappearance of the route to the FEC). To minimize the potential mis-routing caused by such conditions, when creating a new <label, FEC> binding, the node should pick up the least recently used label. Once a node releases a label, the node should not re-use this label for advertising a <label, FEC> binding to a neighbor that supports graceful restart for at least the Restart Time, as advertised by the neighbor to the node.

§4.3.2.2 Second Alternative Embodiment for Use with Border Gateway Protocol (BGP)

The exemplary method described in this section assumes that the restarting node has (at least) as many unallocated labels as allocated labels. The allocated labels define the MPLS forwarding state that the restarting node preserved across the restart of its control component. The unallocated labels are used for allocating labels after the restart of the control component is completed.

After the control component of the node has restarted, it follows the procedures as specified in the BGP route graceful restart draft. In addition, if the node preserved its MPLS forwarding state across the restart, it advertises this to its peer(s) (e.g., neighbors) by appropriately setting the Flag field in the Graceful Restart Capability. This is a special case of 920 and block 932 of FIG. 9.

To create local label bindings, the restarting node uses unallocated labels (this is pretty much the normal procedure). See, e.g., block 945 of FIG. 9. Consequently, as long as the restarting node retains the MPLS forwarding state that the LSR preserved across the restart of its control component, the (allocated) labels from that state are not used for creating local label bindings.

The restarting node should retain the MPLS forwarding state that it preserved across the restart at least until it sends End-of-RIB marker to all of its peers (e.g., neighbors). By that time, the restarting node will have already completed its route selection process, and also advertised its Adj-RIB-Out to its peers. It may be desirable to retain the forwarding state even a bit longer, as to allow the peers to receive and process the routes that have been advertised by the restarting node. After that, the restarting node may delete the MPLS forwarding state that it preserved across the restart. Thus, in contrast to the general method FIG. 9, the restart may be considered completed when its sends the End-of-RIB marker to all of its peers.

Note that while a node is restarting, it can possibly have two local label bindings for a given BGP route—one (in allocated label entries) that was retained from before the restart was initiated, and another (in unallocated label entries) that was created after the restart of the control component was completed. Once the node completes its restart, the former will be deleted. In any event, if there are two bindings for the same path, both of the bindings would have the same outgoing label (and the same next hop).

§4.3.3 Label Distribution Protocol (LDP) Used to Signal Labels

Recall that the LDP protocol can be used to signal labels. Referring back to FIG. 8, in one exemplary embodiment, the communication 830 advertising a node's restart capability can take place within an LDP "initialization" message, a node can discover that its peer node is down 850 based on LDP "hello" messages, communicating whether or not a restarting node was able to preserve its forwarding state information can take place in an LDP "session" message, and communicating new {FEC, label} information, and {next hop} information 870,875 can take place within LDP "label mapping" and "address" messages, respectively.

This embodiment of the invention helps to minimize the negative effects on MPLS traffic caused by a restart of a node' LDP component.

An LSR indicates that it is capable of supporting LDP Graceful Restart, as described here, by including the Graceful Restart TLV as an Optional Parameter in the LDP Initialization message.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|    Type (TBD)           |            Length = 8           |
+-+-+-+-+-+-+-+-+-+-+-+-+-+-+-+-+-+-+-+-+-+-+-+-+-+-+-+-+-+-+-+-+
|                    Restart Time (in milliseconds)             |
+-+-+-+-+-+-+-+-+-+-+-+-+-+-+-+-+-+-+-+-+-+-+-+-+-+-+-+-+-+-+-+-+
|                   Recovery Time (in milliseconds)             |
+-+-+-+-+-+-+-+-+-+-+-+-+-+-+-+-+-+-+-+-+-+-+-+-+-+-+-+-+-+-+-+-+
```

In one embodiment, the value field of the Graceful Restart TLV contains two components—Restart Time and Recovery Time. The Restart Time is the time (in milliseconds) that the sender of the TLV would like the receiver of that TLV to wait after the receiver detects the failure of LDP communication with the sender. While waiting, the receiver should retain the LDP and MPLS forwarding state for the (already established) LSPs that traverse a link between the sender and the receiver. The Restart Time should be long enough to allow the restart of the control plane of the sender of the TLV, and specifically its LDP component to bring it to the state where the sender could exchange LDP messages with its peer(s) (e.g., neighbors).

For a restarting node, the Recovery Time carries the time (in milliseconds) that it is willing to retain its MPLS forwarding state that it preserved across the restart of its control component. The time is from the moment the node sends the Initialization message that carries the Graceful Restart TLV after the restart of its control component has been completed. (Recall, e.g., 865 of FIG. 8.) Setting the Recovery Time to 0 indicates that the MPLS forwarding state wasn't preserved across the restart of the control component (or even if it was preserved, is no longer available).

For a peer node to the restarting node that re-established an LDP adjacency with the peer node, this is the time (in milliseconds) that the peer node is willing to retain the label-FEC bindings that have been received from restarting node before its restart. The time is from the moment the restarting node sends the Initialization message that carries the Graceful Restart TLV. (Recall 855 of FIG. 8.) The Recovery Time should be long enough to allow the peer nodes to re-sync all the LSP's in a graceful manner, without creating congestion in the LDP control plane.

In this section, "the control plane" means "the LDP component of the control plane". Further, in this section, "MPLS forwarding state" means either <incoming label→(outgoing label, next hop)> (non-ingress case), or <FEC→(outgoing label, next hop)> (ingress case) mapping.

In addition to the MPLS forwarding state, a restarting node should also be able to preserve its IP forwarding state across the restart of its control component. Exemplary ways to preserve IP forwarding state across the restart are known. See, e.g., the Internet drafts: "Hitless OSPF Restart", draft-ietf-ospf-hitless-restart-01.txt (Internet Engineering Task Force); "Restart Signaling for ISIS", draft-shand-isis-restart-00.txt (Internet Engineering Task Force); and "Graceful Restart Mechanism for BGP", draft-ietf-idr-restart-00.txt (Internet Engineering Task Force). Each of these Internet drafts is incorporated herein by reference.

§4.3.3.1 First Alternative Embodiment for Use with Label Distribution Protocol (LDP)

After a node restarts its the LDP part of its control plane, it should check whether it preserved its MPLS forwarding state from prior to the restart. If not, then the node sets the Recovery Time to 0 in the Graceful Restart TLV that the node sends to its peer(s) (e.g., neighbors). This is a special case of block 622 of FIG. 6. If, on the other hand, the restarting node preserved the forwarding state, then it starts an internal timer, called MPLS Forwarding State Holding timer (the value of that timer should be configurable), and marks all the MPLS forwarding state entries as "stale". This is a special case of blocks 629 and 630 of FIG. 6. At the expiration of the MPLS forwarding state holding timer, all the entries still marked as stale should be deleted. (Recall, e.g., 615 and 670 of FIG. 6.) The value of the Recovery Time advertised in the Graceful Restart TLV should be set to the (current) value of the MPLS forwarding state holding timer at the point when the Initialization message carrying the Graceful Restart TLV is sent. This is a special case of block 634 of FIG. 6. The node is in the process of restarting when the MPLS Forwarding State Holding timer is not expired. Once the MPLS forwarding state holding timer expires, the node has completed its restart.

If the label carried in the Mapping message is not an Implicit NULL, the restarting node searches its MPLS forwarding table for an entry with the outgoing label equal to the label carried in the message, and the next hop equal to one of the addresses (next hops) received in the Address message from the peer. If such an entry is found, the node no longer marks the entry as stale. This is a special case of blocks 645, 650, and 655 of FIG. 6. In addition, if the entry is of type <incoming label, (outgoing label, next hop)> (rather than <FEC, (outgoing label, next hop)>), the node associates the incoming label from that entry with the FEC received in the Label Mapping message, and advertises (via LDP) <incoming label, FEC> to its peer(s) (e.g., neighbors). This is a special case of block 660 of FIG. 6. If, on the other hand, the found entry has no incoming label, or if no entry is found, the node follows the normal LDP procedures. (Note that this paragraph describes the scenario where the restarting node is neither the egress node, nor the penultimate hop node that uses penultimate hop popping for a particular LSP. Note also that this paragraph covers the case where the restarting node is the ingress node.)

If the label carried in the Mapping message is an Implicit NULL label, the restarting node searches its MPLS forwarding table for an entry that indicates Label pop (means no outgoing label), and the next hop equal to one of the addresses (next hops) received in the Address message from the peer. If such an entry is found, the restarting node no longer marks the entry as stale, it associates the incoming label from that entry with the FEC received in the Label Mapping message from the peer node (e.g., neighbor), and it advertises (via LDP) <incoming label, FEC> to its peer(s). This is a special case of blocks 640, 645, 650, 655, and 660 of FIG. 6. If the found entry has no incoming label, or if no entry is found, the restarting node follows the normal LDP procedures. (Note that this paragraph describes the scenario where the restarting node is a penultimate hop node for a particular LSP, and this LSP uses penultimate hop popping.)

The foregoing assumes that the restarting node generates the same label for all the LSPs that terminate on the same egress node (different from the restarting node), and for which the restarting node is a penultimate hop node.

If the restarting node is an egress node for a particular FEC, the restarting node is configured to generate a non-NULL label for that FEC, and the node is configured to generate the same (non-NULL) label for all the FECs that share the same next hop and for which the restarting node is an egress node, the restarting node searches its MPLS forwarding table for an entry that indicates Label pop (i.e., no outgoing label), and the next hop equal to the next hop for that FEC. (Determining the next hop for the FEC depends on the type of the FEC. For example, when the FEC is an IP address prefix, the next hop for that FEC is determined from the IP forwarding table.) If such an entry is found, the restarting node no longer marks this entry as stale, the restarting node associates the incoming label from that entry with the FEC, and advertises (via LDP) <incoming label, FEC> to its peer(s) (e.g., neighbors). If the found entry has no incoming label, or if no entry is found, the restarting node follows the normal LDP procedures.

If a restarting node determines that it is an egress node for a particular FEC, and the restarting node is configured to generate a NULL (either Explicit or Implicit) label for that FEC, then the restarting node just advertises (via LDP) such label (together with the FEC) to its peer(s) (e.g., neighbors).

When a node detects that its LDP session with a restarting peer (e.g., neighbor) went down, and the node knows that the restarting peer is capable of preserving its MPLS forwarding state across the restart (as was indicated by the Graceful Restart TLV in the Initialization message received from the restarting peer), the node should retain the label-FEC bindings received via that session (rather than discarding the bindings), but should mark such retained label-FEC bindings as "stale". This is a special case of blocks 710 and 720 of FIG. 7.

After detecting that the LDP session with the restarting peer went down, the peer should try to re-establish LDP communication with the restarting node. In one embodiment, the amount of time the node should keep its stale label-FEC bindings is set to the lesser of the Restart Time, as was advertised by the restarting node, and a local timer. After that, if the peer node still doesn't establish an LDP session with the restarting peer, all stale bindings should be deleted. This is a special case of blocks 715, 730, 770 and 780 of FIG. 7. The local timer is started when the peer node detects that its LDP session with the restarting node went down. Recall, e.g., event 850 of FIG. 8. The value of the local timer should be configurable.

If the peer node re-establishes an LDP session with the restarting node within the lesser of the Restart Time and the local timer, and the peer node determines that the restarting node was not able to preserve its MPLS forwarding state, the peer node should immediately delete all the stale label-FEC bindings received from that restarting peer. This is a special case of blocks 740 and 743 of FIG. 7. If the peer node determines that the restarting node was able to preserve its MPLS forwarding state (as was indicated by the non-zero Recovery Time advertised by the restarting node (Recall, e.g., communication 860 of FIG. 8.)), the peer node should further keep the stale label-FEC bindings received from the restarting node for as long as the Recovery Time that the restarting node advertises to the neighbor (after that, the bindings still marked as stale should be deleted). The Recovery Time that the peer node advertises to the restarting node should be greater than the Recovery Time the restarting node advertised to the it.

The peer node should try to complete the exchange of its label mapping information with the restarting node within the Recovery Time, as specified in the Graceful Restart TLV received from the restarting node. The peer node should handle the Label Mapping messages received from the restarting node by following the normal LDP procedures, except that (a) it should treat the stale entries in its Label Information Base (LIB) as if these entries have been received over the (newly established) session, (b) if the label-FEC binding carried in the message is the same as the one that is present in the LIB, but is marked as stale, the LIB entry should no longer be marked as stale, and (c) if for the FEC in the label-FEC binding carried in the message there is already a label-FEC binding in the LIB that is marked as stale, and the label in the LIB binding is different from the label carried in the message, the peer node should just update the LIB entry with the new label. This is a special case of block 760 of FIG. 7.

Once a node creates a <label, FEC> binding, it should keep the value of the label in this binding for as long as it has a route to the FEC in the binding. If the route to the FEC disappears, and then re-appears again later, then this may result in using a different label value. This may occur because when the route re-appears, the node would create a new <label, FEC> binding. Also, the label that was used for the original (old) label binding could be re-used for some other label binding after the old binding is deleted (due to the disappearance of the route to the FEC). To minimize the potential mis-routing caused by the such conditions, when creating a new <label, FEC> binding the node should pick up the least recently used label. Once an node releases a label, it should not re-use this label for advertising a <label, FEC> binding to a peer node that supports graceful restart for at least the sum of Restart Time plus Recovery Time, as advertised by the restarting node peering with the node.

§4.3.3.2 Second Alternative Embodiment for Use with Label Distribution Protocol (LDP)

The exemplary method described in this section assumes that the restarting node has (at least) as many unallocated labels as allocated labels. The allocated labels define the MPLS forwarding state that the node managed to preserve across the restart.

After a node restarts its control plane, it should check whether it was able to preserve its MPLS forwarding state from before the initiation of the restart. This is a special case of block 920 of FIG. 9. If not, then the node sets the Recovery Time to 0 in the Graceful Restart TLV that it sends to its peer (e.g., neighbor) nodes. This is a special case of block 922 of FIG. 9. If, on the other hand, the forwarding state has been preserved, then the node starts its internal timer, called MPLS Forwarding State Holding timer (the value of that timer should be configurable), and marks all the MPLS forwarding state entries as "stale". This is a special case of blocks 920, 929 and 930 of FIG. 9. At the expiration of the timer, all the entries still marked as stale should be deleted (or not used and made unallocated). This is a special case of block 970. The value of the Recovery Time advertised in the Graceful Restart TLV should be set to the (current) value of the timer at the point when the Initialization message carrying the Graceful Restart TLV is sent. This is a special case of block 934 of FIG. 9.

While a node is restarting, it creates local label binding(s) by following the normal LDP procedures. Note that while a node is in the process of restarting, it may have not one, but two local label bindings for a given FEC—one that was retained from before the initiation of the restart, and another that was created after the restart. Once the node completes its restart, the former will be deleted. Both of these bindings though would have the same outgoing label (and the same next hop).

§4.3.4 Reservation Protocol (RSVP) Used to Signal Labels

If a node could preserve its MPLS forwarding state across restart of its control plane, and specifically its RSVP-TE component, it may be desirable not to perturb the LSPs going through that node (and specifically, the LSPs established by RSVP-TE). This section describes a method that helps to minimize the negative effects on MPLS traffic caused by the restart of the control plane, and specifically by the restart of its RSVP-TE component, of a node that can preserve the MPLS forwarding component across the restart. The method described in this section also helps to minimize the negative affects on MPLS traffic caused by the disruption of the communication channel that is used to exchange RSVP messages between a pair of nodes, when the communication channel is separate from the channels carrying the actual LSPs, and the channels carrying the actual LSPs are not disrupted.

One embodiment of this method uses a new object dubbed RESTART_CAP. The RSVP-TE Graceful Restart may also use one of the objects—RECOVER_LABEL, defined in GMPLS (an alternative to using the RECOVER_LABEL object would be to define a new object).

The RESTART_CAP objection is used to indicate to a peer node(s) the Graceful Restart capability (as well as several parameters associated with this capability), of a node. This object may be carried in RSVP Hello messages. In one exemplary embodiment, the RESTART_CAP object has the following format:

```
        Class = RESTART_CAP Class, C_Type = 1

+-------------+-------------+-------------+-------------+
  |            Restart Time (in milliseconds)             |
  +-------------+-------------+-------------+-------------+
  |            Recovery Time (in milliseconds)            |
  +-------------+-------------+-------------+-------------+
```

This messaging is a special case of block 605 of FIG. 6.

The Restart Time is a time (e.g., in milliseconds) that the sender of the RESTART_CAP object would like the receiver of that object to wait after the receiver detects the failure of RSVP communication with the sender. While waiting, the receiver should retain the RSVP and MPLS forwarding state for the (already established) LSPs that traverse a link between the sender and the receiver. The Restart Time should long enough to allow the restart of the control plane, and specifically its RSVP-TE component. Likewise, the Restart Time should be long enough to allow the restart of the communication channel that is used, among other things, for RSVP communication.

The Recovery Time for a restarting node, is the time (e.g., in milliseconds) that the restarting node is willing to retain its MPLS forwarding state that it preserved across the restart of its control component. The time is from the moment the node sends the RSVP Hello message carrying this information. Setting this time to 0 indicates that the forwarding state wasn't preserved across the restart of the control component (or even if it was preserved, is no longer available). For an (non-restarting) node that re-established an RSVP adjacency with a restarting node, this is the time (e.g., in milliseconds) that it is willing to retain its RSVP and MPLS state for the (already established) LSPs that traverse a link between the peer node and the restarting node. The Recovery Time should be long enough to allow the peer (e.g., neighboring) node's to re-sync all the LSP's in a graceful manner, without creating congestion in the RSVP-TE control plane.

To support RSVP-TE Graceful Restart method, a RSVP Hello message can be as follows:
<Hello Message>::=<Common Header>[<INTEG-RITY>]<HELLO>[<RESTART_CAP>]

Note that a node should advertise this capability to peer node only when the Dst_instance that it advertises to the peer node is 0.

The Restarting Mode

After a node has completed the restart of its control plane, it should check whether it was able to preserve its MPLS forwarding state from before the initiation of the restart. If not, then the restarting node sets the Recovery Time to 0 in the Hellos that it sends to its peer (e.g., neighbor) node(s). This is a special case of blocks 620 and 622 of FIG. 6. If, on the other hand, the restarting node has preserved its forwarding state, then it starts its internal timer, called MPLS Forwarding State Holding timer (the value of that timer should be configurable), and marks all the MPLS forwarding state entries as "stale". This is a special case of blocks 620, 629 and 630 of FIG. 6. At the expiration of the timer all the entries still marked as stale should be purged. This is a special case of block 670 of FIG. 6. The value of the Recovery Time advertised in RSVP Hello messages should be set to the (current) value of the timer at the point when the Hello message carrying the Recovery Time is sent. This is a special case of block 634 of FIG. 6.

When a restarting node receives a Path message from an (upstream) peer (e.g., neighbor), it first checks if it has an RSVP state associated with the message. If the state is found, then the restarting node handles this message normally (e.g., according to the procedures defined in "RSVP-TE: Extensions to RSVP for LSP tunnels", *Request for Comments* 3209 (Internet Engineering Task Force, December 2001) (Hereafter referred to as "RFC 3209"), and incorporated herein by reference.) (this is irrespective of whether the message carries the RECOVER_LABEL object or not). In addition, if the restarting node is not the tail-end of the LSP associated with the Path message, and the downstream peer (e.g., neighbor) is also restarting, then the upstream restarting node places the outgoing label (the label that was received in the LABEL object from that neighbor prior to the neighbor's restart) in the RECOVER_LABEL object of the Path message that the upstream restarting node sends to the downstream (neighbor) restarting node. If, on the other hand, the RSVP state is not found, and the message does not carry the RECOVER_LABEL object, the restarting node treats this Path message as a setup for a new LSP, and handles it normally (e.g., according to the procedures defined in RFC 3209). If the RSVP state is not found, and the message carries the RECOVER_LABEL object, the restarting node searches its MPLS forwarding table (the one that was preserved across the restart) for an entry whose incoming label is equal to the label carried in the RECOVER_LABEL object (in the case of link bundling, this may also involve first identifying the appropriate incoming component link). If the MPLS forwarding table entry is not found, the restarting node treats this as a setup for a new LSP, and handles it normally (e.g., according to the procedures defined in RFC 3209). If the MPLS forwarding table entry is found, the appropriate RSVP state is created, the entry is bound to the LSP associated with the message, and the entry is no longer marked as stale. In addition, if the restarting node is not the tail-end (egress) node of the LSP, and the next hop node is also restarting, the outgoing label from the entry is sent in the SUGGESTED_LABEL object of the Path message further downstream (in the case of link bundling the found entry also identifies the appropriate outgoing component link). These are special cases of blocks 640, 645, 650, 655 and 660 of FIG. 6 where the upstream neighbor node gives the restarting node the label binding.

For any bidirectional LSPs (See, e.g., the Internet draft, "Generalized MPLS Signaling—RSVP-TE Extensions", draft-ietf-mpls-generalized-rsvp-te-06.txt (Internet Engineering Task Force).), in addition to the acts described above, the restarting node extracts the label from the UPSTREAM_LABEL object carried in the received Path message, and searches its MPLS forwarding table for an entry whose outgoing label is equal to the label carried in the object (in the case of link bundling, this may also involved first identifying the appropriate incoming component link). If the MPLS forwarding table entry is not found, the restarting node treats this as a setup for a new LSP, and handles it normally (e.g., according to the procedures defined in RFC 3209). If, on the other hand, the MPLS forwarding table entry is found, the entry is bound to the LSP associated with the Path message, and the entry is no longer marked as stale. In addition, if the restarting node is not the tail-end (egress) node of the LSP, the incoming label from that entry is sent in the UPSTREAM_LABEL object of the Path message further downstream (in the case of link bundling the found entry also identifies the appropriate outgoing component link).

Any Resv messages are processed normally (e.g., as specified in RFC 3209), except that if the restarting node, while in the process of restarting, receives a Resv message for which it has no matching Path State Block, the node should not generate an RERR message specifying "no path information for this Resv", but just should drop the Resv message.

Procedures for Restart of RSVP Communication for a Node Peering with (Neighboring) the Restarting Node.

When a node detects that its communication with a peer node's control component went down, and the node knows that the peer node can preserve its MPLS forwarding state across restart (as was indicated by the presence of the RESTART_CAP object in the Hello messages received from the peer node), the node should wait certain amount of time before taking any further actions with respect to the node whose control plane went down. The amount of time the node is willing to wait is set to the lesser of the Restart Time, as was advertised by the peer node with the down control place, and a local timer. The local timer is started when the node detects that its communication with the peer node's control plane went down. The value of the local timer should be configurable. While waiting, the node should try to re-establish RSVP communication with the peer node having the down control component.

If the restarting node's control component doesn't restart within that time, or restarts within that time but the restarting node wasn't able to preserve its MPLS forwarding state across the restart (as indicated by a non-zero) Recovery Time carried in the RESTART_CAP object of the RSVP hellos received from the restarting node), the peer node should send the appropriate RSVP error messages (See, e.g., those specified in RFC 3209 and/or initiate re-routing of the LSPs for which the restarting node is the next hop. This is a special case of blocks 740 and 745 of FIG. 7. If, on the other hand, the restarting node's control component restarted within the time and was able to preserve its MPLS forwarding state across the restart of its control component (as indicated by a non-zero Recovery Time carried in the RESTART_CAP object of the RSVP Hellos received from the neighbor), the following occurs. For each LSP that traverses the peer node for which the restarting peer node is the next hop, the node places the outgoing label (the label that was received in the LABEL object from the restarting peer node before it initiated a restart) in the RECOVER_LABEL object of the path message that the peer node sends to the restarting peer node. This is a special case of blocks 740 and 750 of FIG. 7 in which the Path message that the peer sends to the restarting node contains (in the RECOVER_LABEL object) the label binding that the restarting node sent to the peer before the restart.

If the peer node has completed its restart, the node handles Path messages from the restarted peer node normally (e.g., according to procedures defined in RFC 3209).

Any Resv messages are handled normally (e.g., according to procedures defined in RFC 3209), except that the node should send no Resv message to a restarting peer node until it first receives a Path message(s) from the restarting peer node.

If there are many LSPs going through the restarting node, the peer node should avoid sending Path messages in a short time interval. Otherwise, the restarting node's control component (e.g., CPU) may be unnecessarily stressed. Instead, it should spead the messages across the Recovery Time interval.

A node can determine that the control plane of its peer went down using known (e.g., published) or proprietary techniques.

Note that RSVP graceful restart is applicable not just to packet switched networks, but also to circuit-switched networks as well. For example, RSVP graceful restart can be specifically applied to the networks that use Generalized MPLS (GMPLS) as the control component. Therefore the invention is generally applicable to data, not just "packets" and is not limited to use in nodes such as routers, but can also be used in other nodes such as Optical Cross-Connects, SONET/SDH Cross-Connects, etc.

Fast Reroute and Graceful Restart

The RSVP-TE graceful restart of the present invention can be used to complement fast reroute techniques that are designed to protect traffic during failures. The may be applied in accordance with the following conditions:

If the interface to a neighbor is up, and the LSR does not detect any communication problem with the neighbor's control plane, do nothing.

If the interface to a neighbor is up, and the LSR detects that its communication with a neighbor's control plane went down, the LSR should activate RSVP-TE graceful restart.

If the interface to a neighbor is up, but the LSR cannot receive Hello messages from the neighbor, the LSR should activate RSVP-TE graceful restart.

If the interface to a neighbor goes down, the LSR should activate fast reroute.

§4.3.5 Exemplary Apparatus

Figure 10:
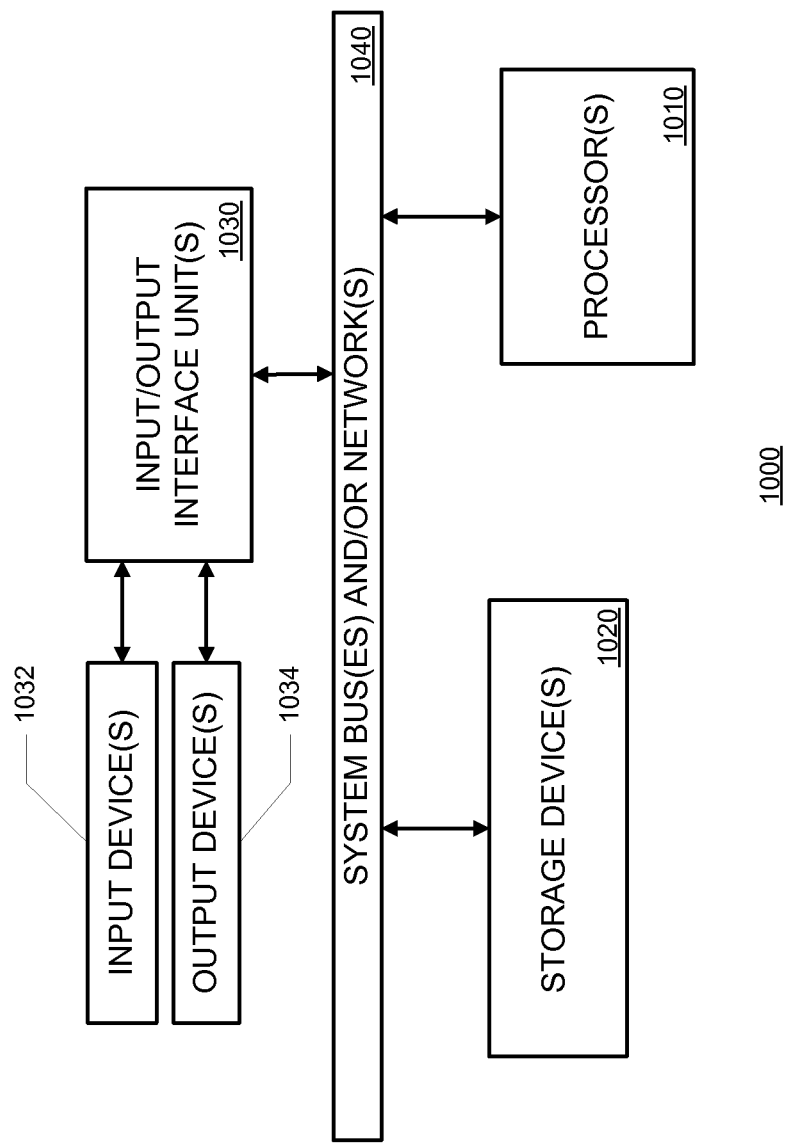
FIG. 10 is a block diagram of an apparatus that may be used to effect at least some aspects of the present invention.

FIG. 10 is high-level block diagram of a machine 1000 which may effect one or more of the operations discussed above. The machine 1000 basically includes a processor(s) 1010, an input/output interface unit(s) 1030, a storage device(s) 1020, and a system bus(es) and/or a network(s) 1040 for facilitating the communication of information among the coupled elements. An input device(s) 1032 and an output device(s) 1034 may be coupled with the input/output interface(s) 1030. Operations of the present invention may be effected by the processor(s) 1010 executing instructions. The instructions may be stored in the storage device(s) 1020 and/or received via the input/output interface(s) 1030. The instructions may be functionally grouped into processing modules.

The machine 1000 may be a router or a label-switching router for example. In an exemplary router, the processor(s) 1010 may include a microprocessor, a network processor, and/or (e.g., custom) integrated circuit(s). In the exemplary router, the storage device(s) 1020 may include ROM, RAM, SDRAM, SRAM, SSRAM, DRAM, flash drive(s), hard disk drive(s), and/or flash cards. At least some of these storage device(s) 1020 may include program instructions defining an operating system, a protocol daemon, and/or other daemons. In a preferred embodiment, the methods of the present invention may be effected by a microprocessor executing stored program instructions (e.g., defining a part of the protocol daemon). At least a portion of the machine executable instructions may be stored (temporarily or more permanently) on the storage device(s) 1020 and/or may be received from an external source via an input interface unit 1030. Finally, in the exemplary router, the input/output interface unit(s) 1030, input device(s) 1032 and output device(s) 1034 may include interfaces to terminate communications links.

Naturally, the operations of the present invention may be effected on systems other than routers. Such other systems may employ different hardware and/or software.

§4.4 Conclusions

As can be appreciated from the foregoing disclosure, when a node has to restart its control component, or a (e.g., label-switched path signaling) part of its control component, the present invention discloses apparatus, data structures and methods than minimize the effect of such restarts on label switched path(s) that include the restarting node.

What is claimed is:

1. A computer-implemented method for use in a data forwarding node including stored label information, a control component for generating and maintaining forwarding information based on the stored label information, and a forwarding component for forwarding information along a switched path based, at least in part, on the forwarding information, wherein the data forwarding node attempts to preserve forwarding information across the restart of the control component, and belongs to a switched path, the computer-implemented method comprising:

a) generating a message indicating that the data forwarding node attempts to preserve forwarding information across the restart of the control component; and
   b) forwarding the message to at least one other node that belongs to the switched path.

2. The computer-implemented method of claim 1 further comprising:

c) tracking, using a timer, a time that the data forwarding node will keep and use any preserved forwarding information after the restart of the control component.

3. The computer-implemented method of claim 1, wherein the message further includes a recovery time value indicating a time that the data forwarding node agrees to retain label-based forwarding information preserved across the restart of the control component.

4. The computer-implemented method of claim 1, wherein the message further includes a restart time value indicating a time that the data forwarding node requests its peers to wait upon learning that the control component of the data forwarding node is restarting.

5. The computer-implemented method of claim 1, wherein the message further includes (i) a recovery time value indicating a time that the data forwarding node agrees to retain label-based forwarding information preserved across the restart of the control component and (ii) a restart time value indicating a time that the data forwarding node requests its peers to wait upon learning that the control component of the data forwarding node is restarting.

6. A computer-implemented method for use in a data forwarding node which is a part of a switched path including a second data forwarding node, the second data forwarding node including a control component for generating and maintaining forwarding information, and the second data forwarding node attempts to preserve forwarding information across the restart of the control component, the computer-implemented method comprising:

a) storing label information;
   b) generating and maintaining forwarding information based on the label information stored;
   c) storing the forwarding information generated and maintained;

d) forwarding information along a switched path based, at least in part, on the forwarding information stored;

e) accepting an advertisement from the second data forwarding node, the advertisement indicating that the second data forwarding node attempts to preserve forwarding information across the restart of the control component; and f) responsive to a determination that the control component of the second data forwarding node is down,
  i) starting a first timer, and
  ii) indicating, for entries in the forwarding information associated with the switched path, that they were provided before the restart of the control component of the second data forwarding node.

7. A control component for generating and maintaining forwarding information based on stored label information in a data forwarding node including a forwarding component for forwarding information along a switched path based, at least in part, on the forwarding information, wherein the data forwarding node attempts to preserve forwarding information across the restart of the control component, and belongs to a switched path, the control component comprising:

a) one or more processors; and b) one or more storage devices storing
  1) label information, and
  2) processor-executable instructions which, when executed by the one or more processors, perform a method comprising
    A) generating, with the data forwarding node, a message indicating that the data forwarding node attempts to preserve forwarding information across the restart of the control component; and
    B) forwarding, with the data forwarding device, the message to at least one other node that belongs to the switched path.

8. The control component of claim 7, wherein the one or more storage devices further store processor-executable instructions which, when executed by the one or more processors, perform a method further comprising:
  C) tracking, using a timer, a time that the data forwarding node will keep and use any preserved forwarding information after the restart of the control component.

9. The control component of claim 7 further configured to forward the message using at least one of label distribution, resource reservation or border gateway protocols.

10. The control component of claim 7, wherein the message further includes a recovery time value indicating a time that the data forwarding node agrees to retain label-based forwarding information preserved across the restart of the control component.

11. The control component of claim 7, wherein the message further includes a restart time value indicating a time that the data forwarding node requests its peers to wait upon learning that the control component of the data forwarding node is restarting.

12. The control component of claim 7, wherein the message further includes (i) a recovery time value indicating a time that the data forwarding node agrees to retain label-based forwarding information preserved across the restart of the control component and (ii) a restart time value indicating a time that the data forwarding node requests its peers to wait upon learning that the control component of the data forwarding node is restarting.

* * * * *